(12) United States Patent
Felder et al.

(10) Patent No.: US 6,543,983 B1
(45) Date of Patent: Apr. 8, 2003

(54) ROBOTIC PICK UP AND DELIVER SYSTEM

(75) Inventors: Robin Felder, Charlottesville, VA (US); Randy Turner, Charlottesville, VA (US); William Holman, Earlysville, VA (US); Chris Estey, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 09/501,863

(22) Filed: Feb. 10, 2000

Related U.S. Application Data

(63) Continuation of application No. PCT/US98/14041, filed on Jul. 7, 1998.

(51) Int. Cl.[7] .............................................. B65G 67/00
(52) U.S. Cl. .................. 414/402; 414/331.07; 414/389
(58) Field of Search ...................... 414/222.09, 222.13, 414/226.01, 265, 277, 279, 286, 331.07, 331.08, 337, 338, 343, 389, 395, 396, 402, 539, 584, 806, 809, 909

(56) References Cited

U.S. PATENT DOCUMENTS

| | | | | |
|---|---|---|---|---|
| 3,637,095 A | * | 1/1972 | Kampfer ................ 414/331.08 |
| 3,782,565 A | * | 1/1974 | Doran et al. ................ 414/277 |
| 4,664,590 A | * | 5/1987 | Maekawa ................ 414/279 |
| 4,818,171 A | * | 4/1989 | Burkholder ................ 414/401 |
| 5,024,576 A | * | 6/1991 | Meschi ................ 414/490 |
| 5,104,277 A | * | 4/1992 | Bullock ................ 414/222.09 |
| 5,202,832 A | * | 4/1993 | Lisy ................ 414/343 |
| 5,337,880 A | * | 8/1994 | Claycomb et al. ...... 414/331.08 |
| 5,441,376 A | * | 8/1995 | Napierkowski et al. ...... 414/396 |
| 6,231,292 B1 | * | 5/2001 | Wyssmuller et al. ... 414/331.07 |

FOREIGN PATENT DOCUMENTS

WO   92/00912   *   1/1992   ................ 414/584

* cited by examiner

Primary Examiner—James W. Keenan
(74) Attorney, Agent, or Firm—Robert J. Decker

(57) ABSTRACT

A pick up and delivery system for use with mobile robots which have a body with a horizontal upper surface and at least one vertical side. The robot has at least one shelf, each of which contains a stop bar containing a retaining device. The system further uses multiple stations, each of which contain at least one pallet retaining surface to contain at least two pallets. The pallet retaining surfaces are provided with a holding device at the pick up area and a holding device at the delivery area. Pallets are used to retain the items being transferred with each of the pallets having a securing device that interacts with the holding device and retaining device. The strength of the holding device at the pick up area is less than the holding device at the delivery area, with the robot's retaining device having a strength between the strength of the holding devices. The mobile robot picks up a pallet from a first station, and delivers the pallet to a second station.

25 Claims, 13 Drawing Sheets

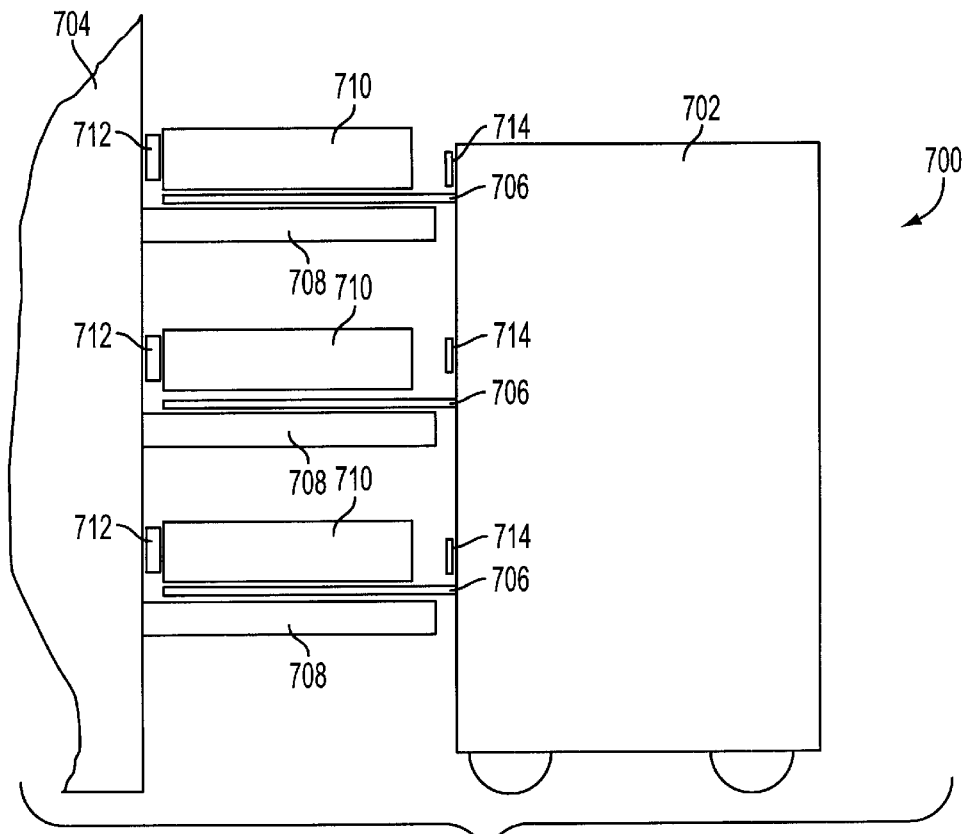
FIG. 12
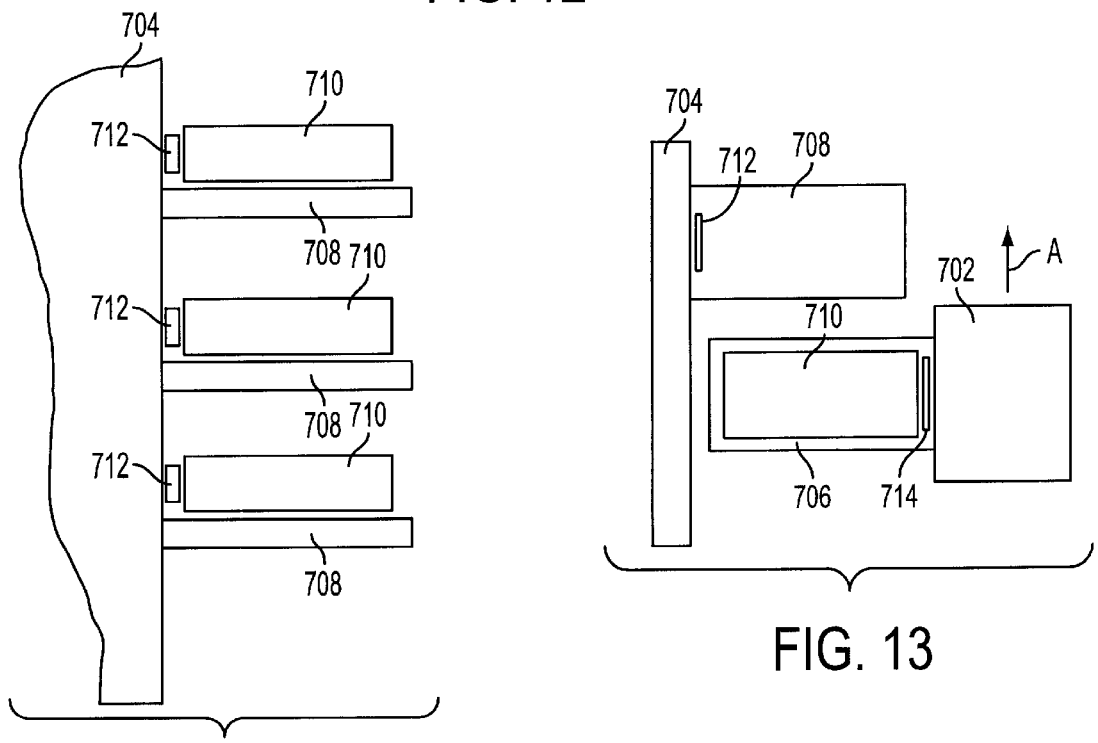
FIG. 13
FIG. 14

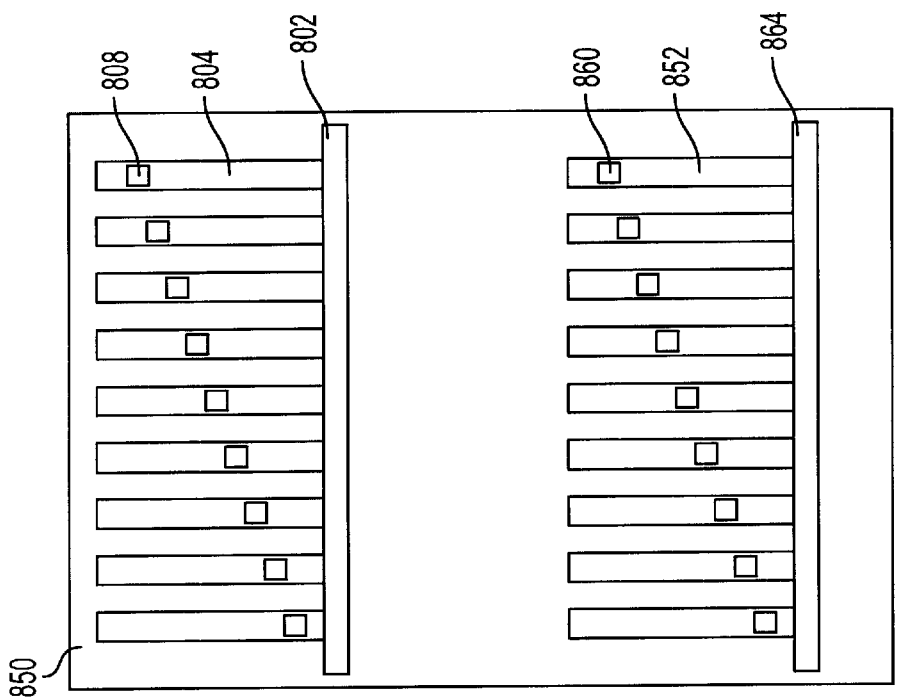
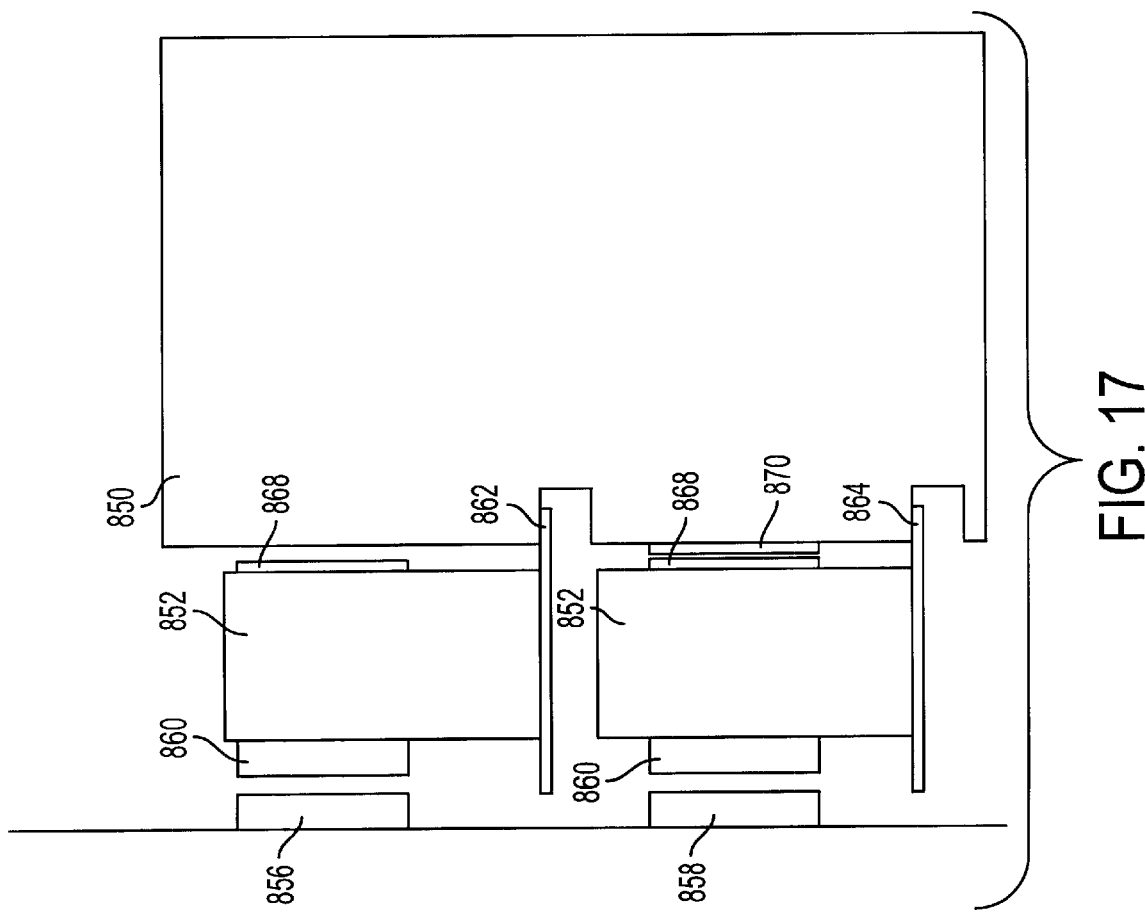

ROBOTIC PICK UP AND DELIVER SYSTEM

This application is continuation of international application No. PCT/US 98/14041, filed Jul. 7, 1998."

BACKGROUND OF THE INVENTION

1. Field of the Invention

The invention relates to a method for rapid robotic pick up and delivery of articles. The subject of this patent application is a system designed to allow robots the capability of pick up and delivery with a minimum of moving parts

2. Brief Description of the Prior Art

The transportation of articles within a structure, or between multiple structures has posed, to some degree, a problem since the industrial revolution. Many transportation options exist today as commercially available products, for example, conveyer belts, pneumatic tubes, gimbled carts, and mobile robots. Mobile robots, or Autonomous Guided Vehicles, are vehicles that have been equipped with a drive system under computer control which allows autonomous guidance between two locations.

The recent availability of sophisticated computing capabilities accessible at the size of a computer chip, has created a revival of the mobile robot field after its introduction in the 1960s, followed by a languishing market in the late 1980s. Initially, robots were used in industrial plants where they became an obvious choice for moving material over greater distances than conveyer belts could reasonably perform. Although, there is significant economic incentive to introduce mobile robots into hospitals and laboratories, relatively little progress has been made towards using mobile robots to deliver hospital supplies or even participate in the process of laboratory analysis. For example, the physical movement of medical specimens, pharmaceuticals, blood products, patient charts, x-rays, and meals cost over 1 million dollars annually for hospitals with over 500 beds. In buildings where laboratories are spread out over a large geographic area, specimen delivery can account for a large percentage of technologist time. Pharmaceutical laboratories process large numbers of samples and transportation of these samples can readily be standardized to be compatible with mobile robots.

Many laboratories are not yet organized in a streamlined fashion because technologists must react to the changing numbers of laboratory requests, additional processing steps, and problem specimens. Providing conveyance to and from laboratories requires flexibility in order to accommodate the changing analytical requests.

Other industries can benefit from mobile robot technology equipped with automatic pick up and delivery. Currently large corporations employ one or more people to pick up and deliver inter and intraoffice mail or deliver supplies. It is recognized that office automation is a more economical approach and the office automation market is predicted to be a multibillion-dollar industry in the next century. Automatic office delivery will improve the efficiency of today's workforce by providing low cost, predictable and error free delivery of office mail and supplies.

The problem, to date, has not been moving the material, but rather the economic pick up and delivery without human intervention. Although having mobile robots move material from one place to another saves substantial manpower, it is often counteracted by the need of personnel to be present to load and unload the robot. By providing a pick up and delivery system that requires no human participation, the system becomes highly economical and convenient for all employees.

SUMMARY OF THE INVENTION

A pick up and delivery system for use with mobile robots which have a body with a horizontal upper surface and at least one vertical side. The robot has at least one shelf, each of which contains a stop bar containing a retaining device. The shelf can be spaced from, and parallel to, an upper surface of the mobile robot. Alternatively, the shelves can be parallel to the body of the robot. The robot contains sensors to indicate the position of the robot relative to the station. The system further uses multiple stations, each of which contain at least one pallet-retaining surface to contain at least two pallets. The pallet retaining surfaces are provided with a holding device at the pick up area and a holding device at the delivery area. Pallets are used to retain the items being transferred with each of the pallets having a securing device that interacts with the holding device and retaining device. The strength of the holding device at the pick up area is less than the holding device at the delivery area, with the robot's retaining device having a strength between the strength of the holding devices. The mobile robot picks up a pallet from a first station, with the strength of the retaining device being greater than the pick up holding device, thereby transferring the pallet to the robot. At delivery, the delivery holding device is greater than the retaining device, thereby delivering the pallet to the second station.

In one embodiment, the shelf and pallet retaining surfaces are parallel to a base surface. The robot shelf has a height from the base surface slightly greater than the height of the pallet-retaining surface to allow the shelf to overlap the retaining surface. The shelf overlaps the pallet-retaining surface a distance sufficient to allow the retaining device to come in contact with the pallet-securing device. The retaining devices can be magnetic, electromagnetic, or mechanical, such as hook and loop material. The retaining devices can comprise a spring device to allow for horizontal movement of the retaining device. The shelves can further comprise guides to prevent horizontal movement of the pallets during pick up and delivery. Multiple sensors can also be provided on the shelves to register the presence of a pallet. The sensors can be provided at the station and on the robot to transmit the presence of the pallet to a processing unit, in order for the processing unit to track the location of each pallet.

The stations can, in one embodiment be provided with receiving notches positioned at various distances from the base surface. The pallet retaining surfaces are provided with flanges to interact with the receiving notches to affix the pallet receiving surface to the station at various heights.

BRIEF DESCRIPTION OF THE DRAWINGS

The advantages of the instant disclosure will become more apparent when read with the specification and the drawings, wherein:

FIG. 12 is a side view of an alternate embodiment of the invention utilizing a side delivery system;

FIG. 13 is a top view of the robot delivering a pallet in accordance with FIG. 12;

FIG. 14 is a side view of the delivery station of FIG. 12 after the pallets have been delivered;

FIG. 17 is a side view of a container pick up and delivery system using magnets as the transfer means;

FIG. 18 is a front view of the container pick up and delivery system of FIG. 17;

DETAILED DESCRIPTION OF THE INVENTION

Figure 1:
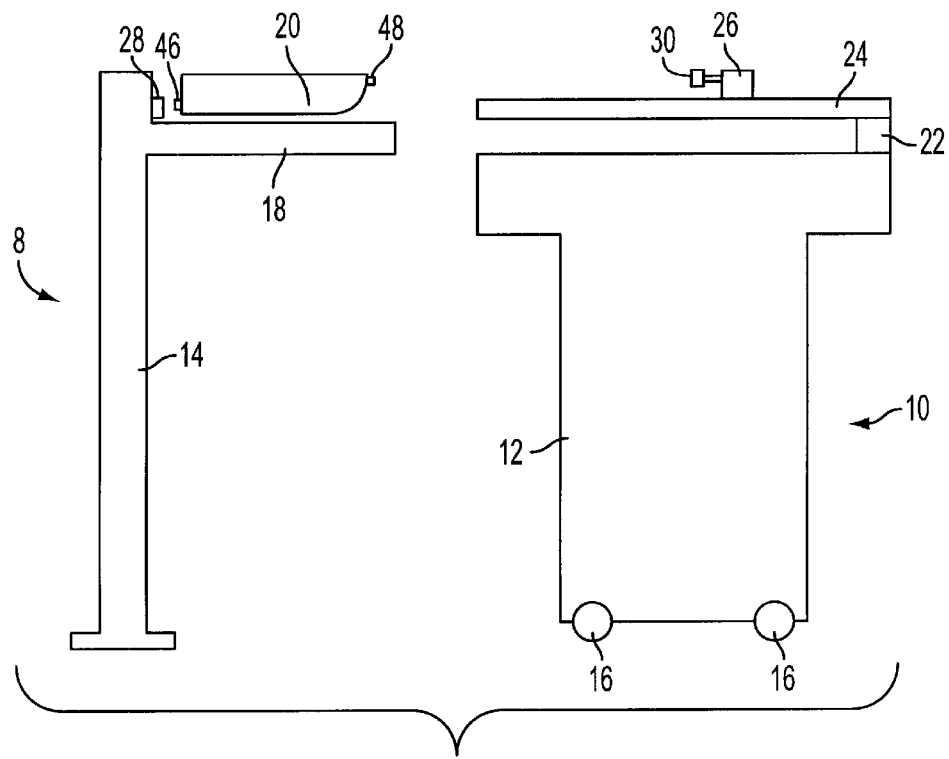
FIG. 1 is a side view of the robot equipped with the disclosed invention approaching the drop-off station.

The disclosed system consists of the hardware and software necessary to perform automated pick up and delivery by mobile robots. Mobile robots improve their utility when they automatically pick up and deliver their payloads since they do not disrupt humans or other machines who may be busy when they arrive ready to perform their tasks. In the disclosed system, the robot will pick up and deliver at predetermined stations without assistance. The items to be picked up are placed at the pick up area of the station, when convenient, for later pick up by the robot. At the time of pick up, the robot will also deliver any items that are scheduled for delivery to that station. Mobile robots are already providing labor savings to manufacturing facilities and hospitals nationwide. However, current mobile robots are not the answer to all delivery needs since many are not equipped to automatically pick up goods to be delivered and drop them off at the delivery location. Clearly, mobile robots will increase their utility when automatic pickup and delivery can be performed since this will obviate the need for continuous staffing at both ends of the delivery route. Mobile robots have also begun to play a role in delivering specimens to various types of medical devices, such as robotic arms and analyzers. Robots could also be an alternative to serial conveyor belt transportation, in which each specimen is treated as a discreet entity, allowing specimens to be redirected to their specific analytical destination. Alternatively, specimens can be sorted into analytical batches that are then transported to the appropriate analytical station by a robot. As long as the batches are frequent and keep pace with the analytical instrument, then the efficiencies of a batch process are similar to serial conveyance and, in some cases, more efficient.

Programmable mobile robots have resulted from the reduced costs of component parts and increased computing capacity of today's microprocessors. The basic elements of a mobile robot are drive motors, sensors, computer, batteries, and an external case. Some mobile robots are not only capable of moving autonomously along the floor, but have also been programmed to ride elevators, open doors, and find their destinations, while not running over people or equipment.

The medical market presents a greater challenge to robots than most applications as they must perform routine tasks in the face of unpredictable obstacles, such as pediatric patients and physically challenged patients who might have limited visual and audio acuity. Delivery is the hospital setting must be performed as efficiently as possible with immediate notification of staff if the assigned task cannot be carried out. An idle robot which has been disabled in a corridor containing vital patient specimens and information (x-rays or charts) could be disastrous for a critically ill patient. The power source of a mobile robot should allow charging during idle moments, or require a battery change at predictable intervals or some combination of the two. Finally, the robots should be repairable from a distance via modem, Internet, wireless communication or by a relatively technologically unskilled user on site.

Mobile robots are beginning to be used to provide a flexible transportation scheme for a few laboratories and are particularly useful in laboratories where there is a long geographical separation between the source and the analytical instrument. When designing conveyance systems, of any type, the following points should be addressed:

1. Determine accessible pickup and drop-off locations.
2. Map the shortest path between pickup and drop-off points.
3. Determine the method for delivery (i.e., conveyers or mobile robots).
4. Program the routing and scheduling of vehicles on the paths and at the pickup and drop-off points. Because of the utility of mobile robots in material transportation, a hierarchical taxonomy has been developed for designing mobile robotic systems. For example:

1. Facilities—determine the number of pick-up and drop-off stations, the extent and number of buffers (holding areas for material) needed.
2. Process Focus—determine the number of vehicles needed in your system
3. Equipment—determine the steering control, routing control, load transfer mechanisms, vehicle guidance system, and vehicle monitoring required.
4. Workstations—determine the exact layout of stations, whether they will operate in parallel or serial fashion and the temporal events that have to be accommodated.

5. Tasks—determine the lot size, delivery times, and job types.
6. Travel specs—determine the layout of the guide-path (if necessary), optimize for efficiency, travel speed, and effects of congestion.
7. Scheduling—determine if there will be fixed or variable schedules, what sequencing is necessary, and the dispatch rules.

A complete transportation system for complex areas, such as laboratories, will undoubtedly become a combination of mobile robots, fixed conveyance and human delivery. Mobile robots, even at this early stage, provide the ultimate flexibility vs. cost for many facilities due to the ease in which routes can be changed. There is little doubt that the sophistication of mobile robots will accelerate over the next decade so that eventually this technology will be able to follow voice commands with flawless precision.

The next stage in the efficient development of mobile robots is automated pick up and delivery of their payloads. This ability makes the robots substantially more useful by eliminating the need of a human to be present during the delivery and pick up schedule. Further herein currently available robots which are readily adaptable for use with the disclosed system are provided for reference. Of the three robots currently being used in laboratories and used herein as examples, two, the HelpMate and the RoboCart, do not currently come equipped with a pickup and delivery mechanism. Approximately 15 seconds of employee time is necessary to unload or load the RoboCart. However, the arrival of the RoboCart is unpredictable and it does not wait for the technologist to finish his/her task before it times out and leaves the delivery location without the technologist having unloaded the payload. Therefore, additional time is wasted by the technologist who must interrupt their routine tasks to deal with the robot.

In the prior art, the Transporter, a mid-sized robot, has incorporated an automatic delivery and pickup mechanism. These mechanisms, however, require moving mechanical devices, designed for huge payloads only, require power and only allow for pick up and delivery of one item at a time. The Saurer Company offers three types of loading and unloading devices for use in conjunction with robots. In one case an active roller system transfers goods in pallets or bins by pulling, or pushing, the bins onto the AGV. As a second option, an automatic lift deck is used when the cart can drive under the lifting mechanism which can then lower (or lift) a payload. The third option includes a bi-directional shuttle arm that transfers the loads from passive holding areas called stands. All of these pickup and delivery devices and systems rely on active mechanical components either on the robot or fixed on a bed, or platform, at the delivery location.

The disclosed device utilizes electromechanical and electromagnetic components that allow material to be picked up and delivered by a mobile robot. The material to be delivered is placed in/on a pallet which automatically is loaded by the robot. When the mobile robot is ready to pick up the material to be delivered, it approaches and docks with the pick-up station. The loading of the pallet takes place when the robot scoops the pallet onto its surface, using the movement of the robot itself. When the pallet is located entirely on the surface of the robot, frictional forces hold the pallet in place while the robot moves away from the pick up point and follows its assigned path. At the drop off location, the robot approaches a drop off station equipped with a pallet holding mechanism. When the robot moves into the station and docks, the pallet-holding mechanism docks with and holds the pallet in place. When the robot leaves the delivery location, it leaves the pallet behind, due to the holding tension at the station being greater than the frictional forces which were keeping the pallet on top of the robot. Although reference is made within the application to magnets and electromagnets, it should be noted that any releasable device can be utilized. This can include hook and loop materials, mechanical or pneumatic devices (i.e. vacuum), or other apparatus which will be apparent to those skilled in the art. The differential in strength or attraction is the critical feature. As will become apparent herein, the pallets are picked up and delivered based on alternating the strength of the affixing devices. Although, as also disclosed, electronics can be incorporated into the system, there are instances where this is not feasible. The disclosed system works equally as well whether the releasing devices electronic or manual.

In the example illustrated in FIG. 1, the robot 10 is approaching the pick-up and delivery (drop-off) station 8 and table top 18. The robot's body 12 contains the computer, visual sensors and other instrumentation equipment required to operate the robot 10 and the configuration illustrated herein serves as an example only. The holding surface 24 is spaced from the body 12 by a spacer 22. The holding surface 24 of the robot must be sufficiently thin to allow it to come between the pallet 20 and the station table top 18 without spilling the contents of the pallet 20 or shoving the pallet 20 against the station 8. The spacer 22 must separate the holding surface 24 from the body 12 at least the depth of the table top 18 to permit the holding; surface 24 to slide over the table top 18. In order to provide the highest efficiency in transferring the pallet 20 from the table top 18 to the holding surface 24, the height of the holding surface 24 must be as close as possible to the height of the table top 18. When the height of the table top 18 is being determined, the surface upon which the wheels 16 travel must be taken into account. An even surface allows for a straight on approach, however any variances, such as carpet, may alter the approach angle. The table leg 14 must be firmly affixed to the floor or wall to prevent tipping. Although an L-shaped configuration is illustrated herein, the table design can be any convenient design that allows clearance for the robot 10 to approach the table and transfer the pallet, bin, tray, etc. The pallet 20 can be a box, platform or other container, that can be equipped with a docking mechanism, such as a magnet, at one or both ends. The pallet is manufactured from plastic, lightweight metal, or any other material appropriate for the end use. The pallet must, obviously, have sufficient space and appropriate configuration to accommodate and retain the material to be transported. Therefore, it may be optimal to have several pallets available of varying sizes.

In some embodiments, it is preferable for the pallet to have sloped ends and/or slides to allow for easier pick up and delivery. The pallets can also be provided with bottom rails to facilitate pick up and delivery. The docking mechanism can either be added to the pallet or manufactured as an integral part of the design. Transport pallets can be designed for specific loading applications, such as loading a clinical analyzer, delivering mail, transporting pharmaceuticals, etc.

Both the table top 18 and the holding surface 24 have a sufficient width to retain at least one pallet 20, and preferably can retain several pallets. The holding surface 24 is provided with a stop bar 26 which contains a pair of magnets 30 and 32 as illustrated further in FIG. 3. The magnets used herein can be electromagnets, which are only active when the delivery is in progress, standard magnets or a mating mechanical device, such as the hook portion of Velcro®. Correspondingly, and illustrated in FIG. 4, the table top 18 has a pair of magnets 28 and 29 which maintain the pallet 20 in the desired position on the table top 18. The dimensions of both the holding surface 24 and the table top 18 must be sufficient to prevent the pallet 20 from falling off onto a bench or floor.

The item picked up and delivered in the disclosed illustrations are pallets 20 that contain the articles to be transferred. The design for the pallets 20 are for illustrative purposes only and, in no way, limit the scope of the invention. The pallets 20 are provided with magnets 46 and 48 to maintain the pallet 20 in position, as well as allow for the transfer, as disclosed hereinafter. The illustrated pallet 20 is provided with a curved front that allows for the table top 18 to smoothly slide under the pallet 20. As the transfer between the table top 18 and the holding surface 24 is preferably smooth, with minimal resistance, the holding surface 24 must be allowed to easily come between the pallet 20 and the table top 18. To allow this to happen, either the end of the receptacle being picked up must be curved or the edge of the holding surface 24 angled.

The robot magnets 30 and 32 are provided with different strengths dependent upon whether the slot is for pick up or delivery of the pallet. The table magnets 28 and 29 are also provided with different strengths, again dependent upon whether the pallet 20 is attached for pick up or delivery. The magnets are placed with the weaker strength opposite the stronger strength. Therefore, when the pallet is to be picked up or delivered, the weaker magnet releases to the stronger magnet.

Figure 2:
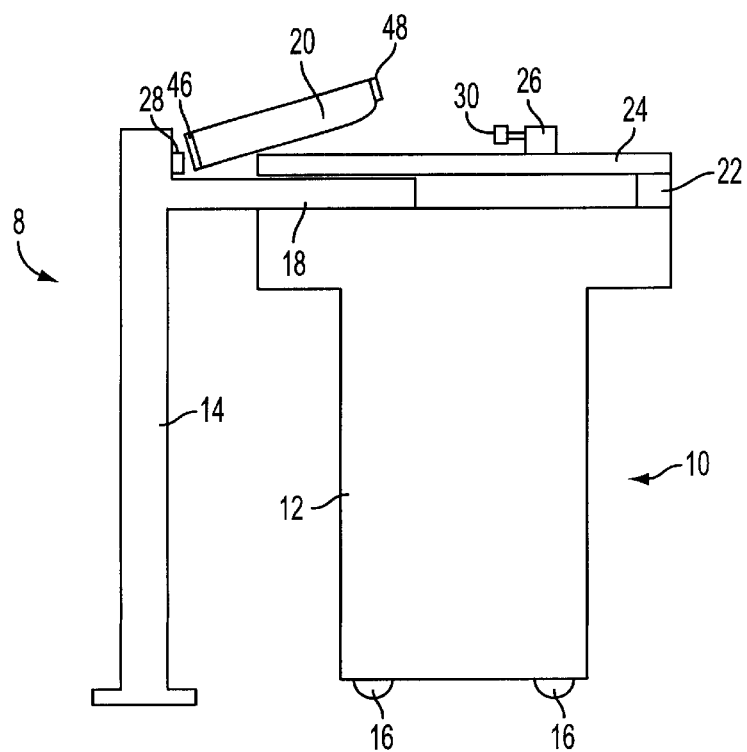
FIG. 2 is a side view of the robot of FIG. 1 overlapping the drop-off station and picking up or delivering the pallet.

In this description, robot magnet 32 will be set for delivery of a pallet 20 to the table top 18 and the robot magnet 30 for pick up of the pallet 20 from the table top 18. To pick up the pallet 20, the robot 10 approaches the table top 18, continuing until the robot 10 is signaled to halt by computer program, physical sensor or the end of the floor tape. As the robot 10 approaches the table top 18, the holding surface 24 is forced between the pallet 20 and the table top 18 as shown in FIG. 2. As the robot 10 continues, the pallet magnet 48 comes in contact with the robot magnet 30. The stronger magnetism of the robot magnet 30 pulls the pallet 20 from the weaker table magnet 28, thereby attaching the pallet 20 to the table top 18.

Figure 3:
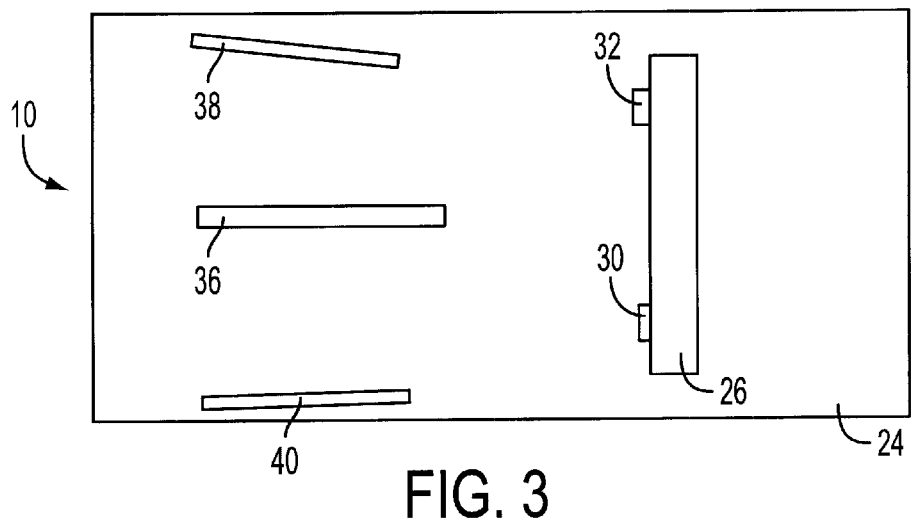
FIG. 3 is a top view of the robot equipped with the delivery system of the disclosed invention.
Figure 4:
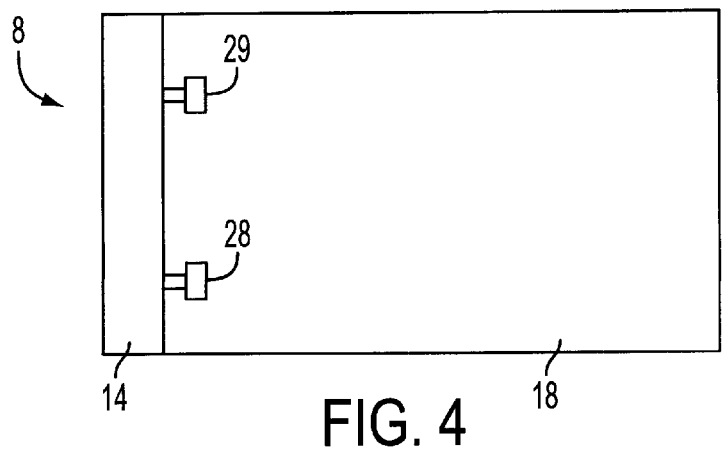
FIG. 4 is a top view of the drop-off station in accordance with the instant invention.

FIG. 3 provides additional illustration of an optional configuration of the holding surface 24. The holding surface 24 comprises a stop bar 26 which contains a pair of magnets 30 and 32. A center guide 36 provides, in conjunction with side guides 38 and 40, direction for the pallet 20. The side guide 40, in combination with the center guide 36, helps to ensure that the magnet 48 of the pallet 20 comes in contact with the table magnet 30 during the pick up process. The side guide 38, in combination with the center guide 36 ensures that the pallet 20 is delivered in a direct path, allowing for maximum contact between the pallet magnet 46 and the table top magnet 29. The side guides 38 and 40 also serve to prevent the pallets 20 from falling off the robot should it stop suddenly. The side guides 38 and 40 further act as supports for the pallet 20, thereby minimizing the force used by the holding surface 24 to lift the pallet 20. Instead of the side guides 38 and 40, a center guide can be used which matches a groove in the bottom of the pallet. Other methods to load, and maintain, the pallets onto the robot will be apparent to those skilled in the art.

Figure 5:
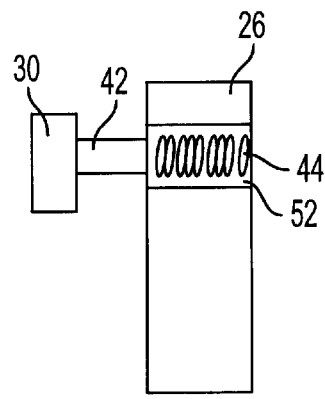
FIG. 5 is a side cutaway view of a spring buffered magnet for use with the instant invention.

The optimum magnet configuration is illustrated in FIG. 5 wherein the magnet 30 is connected to a inset rod 42 which is free to move, in a horizontal direction, within the channel 52. A spring 44 is located within the channel 52 to provide resistance to the rod 42. This is an example of the type of flexible system that can be used. It is preferred that some flexibility be provided in any system to allow for the inexactness of the robot during the docking procedure. In the event the magnet 30, or alternate locking device, is stationary within the stop bar 26, the stop bar 26 is required to directly absorb any impact between the robot and the pallet. The use of a spring loaded connection, or its equivalent, prevents damage to the stop bar 26, pallet 20 and/or contents of the pallet.

Figure 6:
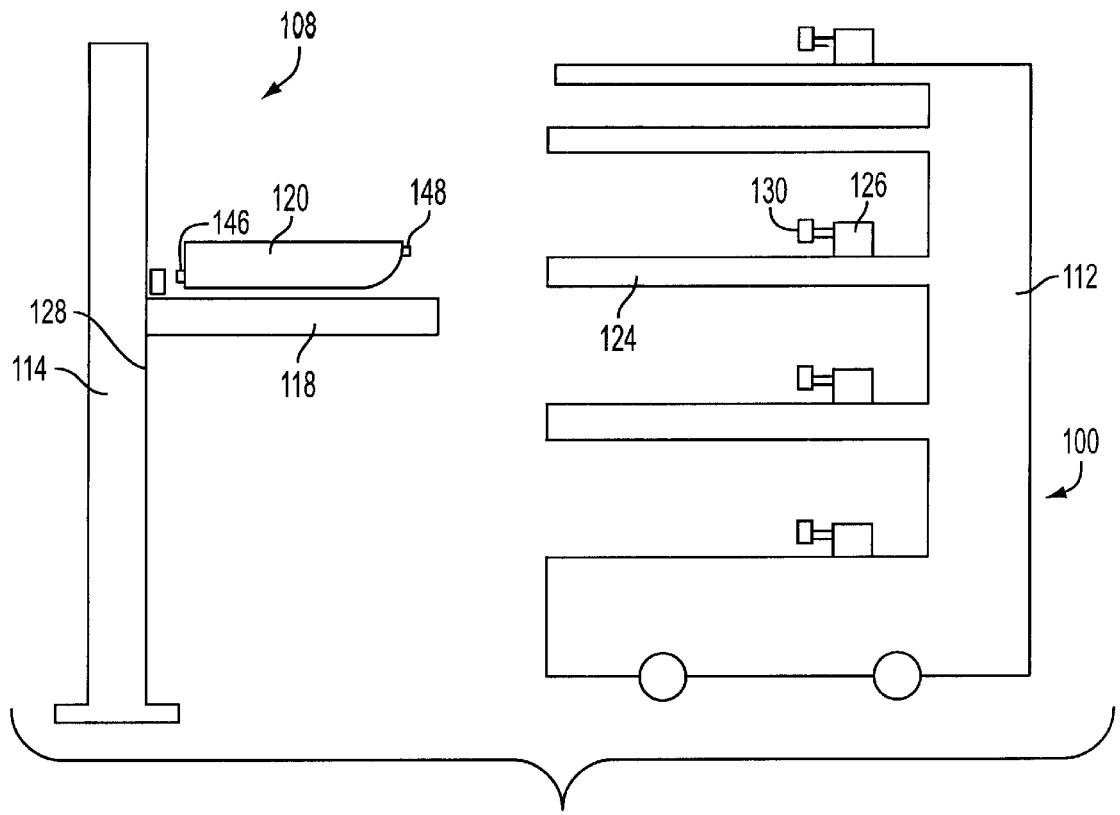
FIG. 6 is a side view of an alternate embodiment of the robotic delivery system having a multiple delivery system.
Figure 7:
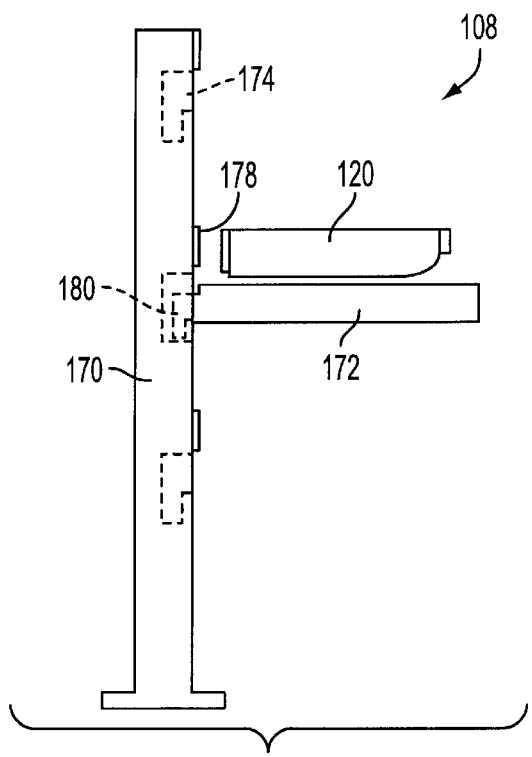
FIG. 7 is a cutaway side view of an alternate embodiment of the drop off station.

An alternate embodiment is illustrated in FIG. 6 wherein a multilevel delivery system 100 is provided. The robot 112 is provided with multiple shelves 124, each of which is provided with a stop bar and a magnet 130. The pallets 120 would remain the same design, utilizing magnets 146 and 148 in the same manner as described heretofore. The table top 118 is affixed to leg 114 at a level which allows for the pallet 120 to be picked up or delivered to a specific level within the robot 112. In this way, a series of pick up and delivery stations 108 can be set out with the table top 118 being placed at a particular level. The robot 112 can then travel from one station 108 to another, approach each station in the same manner as previously described, and only pick up or deliver the appropriate pallets. Alternatively, the leg 170 can be provided with locking inserts 174 at various levels to interact with the multiple shelf 124 levels of the robot 112. The magnet 178 can be affixed to the table top 172, thereby allowing the entire table top 118/magnet 128 combination to be moved to a different height if so desired. Alternatively, magnets can be placed at each level with only the table top 172 being moved. In FIG. 7 the locking inserts 174 receive the locking flanges 180 of the table top 172, however this is only one method of locking the table top the leg and other methods will be obvious to those skilled in the art.

Figure 11:
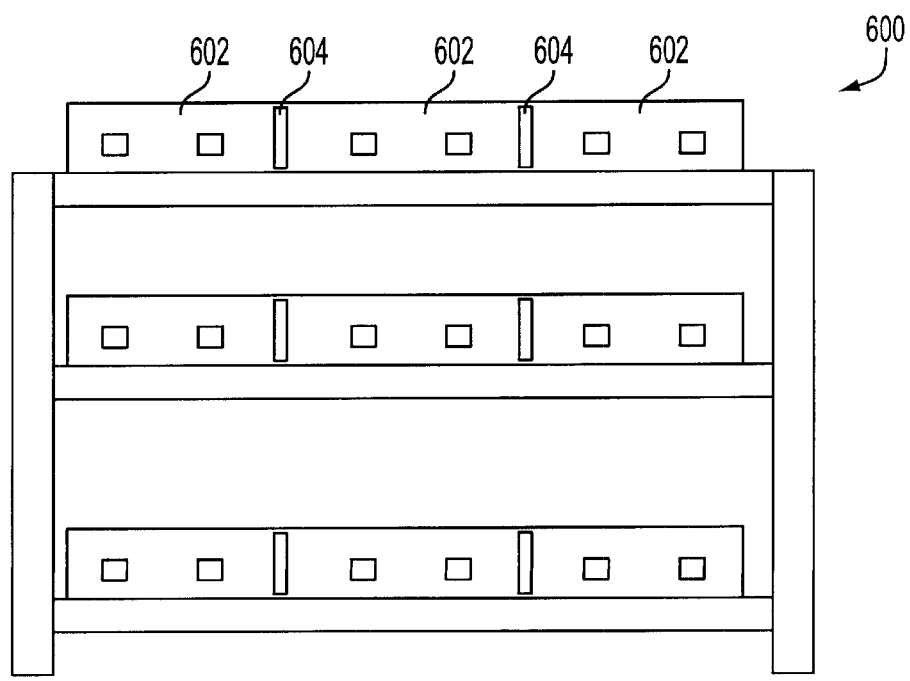
FIG. 11 is a front view of a multi-pallet central station.

Although the table top 18 is illustrated herein as holding two pallets, it should be noted that central pick up and delivery station 600 of FIG. 11 can also be incorporated into the system. In areas where it would be difficult for a robot to maneuver, a centralized station 600 can be installed in an accessible area. The centralized station 600 can be designed to have a width that will accommodate a number of pick-up and delivery pairs 602. It is preferable that the pick-up and delivery pairs 602 are divided by guides 604 to assist in aligning the pallets. Additionally, the guides 604 help provide visual division for the users and can be color coded and marked according to a predetermined system.

Based on the ability of the robot's internal program, in conjunction with the external referencing device, the robot can approach the appropriate pair and access the appropriate pallets. This allows for a number of pallets to be placed at the station 600 at one time to be picked up and delivered according to the robot's schedule.

Figure 8:
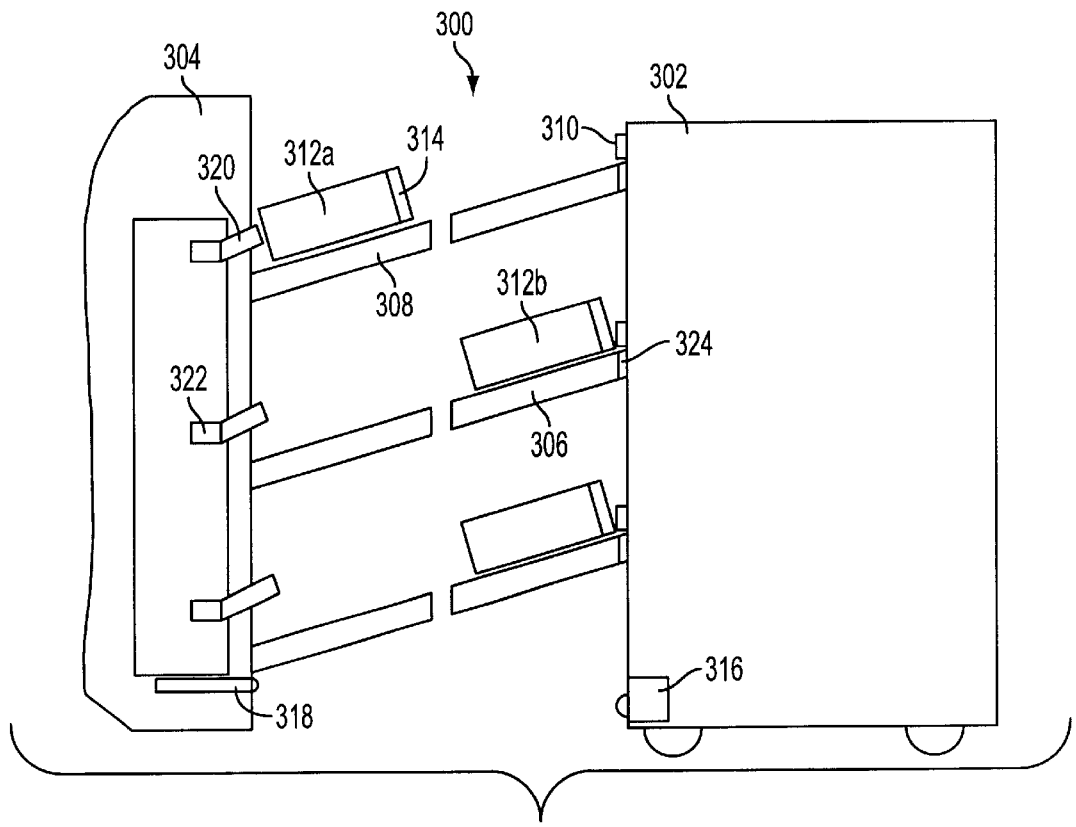
FIG. 8 is a cutaway side view of an alternate multilevel pick up and drop off system.

In the multi-level robot system 300 of FIG. 8, the robot 302 is equipped with multiple, stationary delivery shelves 306. The delivery shelves 306 are at an angle of about 50 to 60 degrees from the vertical side of the robot 302 to allow for gravity transfer of the pallet 312. An attracting device, such as an electromagnet 310, is attached to the side of the robot 302 and is used to hold the pallet 312 on the shelf 306 until delivery. The attracting device 310 additionally pulls the pallet 312 from the stationary shelf 308 back onto the robot shelf 306. In this embodiment the pallet 312 has a magnetic end plate 314 which is attracted to the electromagnet 310. Other configurations can be used, such as a small magnet that is placed to align with the electromagnet 310, and other embodiments will become obvious to those skilled in the art. The advantage for a larger magnetic surface is the elimination of exact alignment between the electromagnet 310 and the interacting device used on the pallet 312. The use of an electromagnet 310, or other device that can independently place, and subsequently release, the pallet 312 onto the delivery shelf 306 is required for optimal independent operation. The robot 302 is also provided with an activation sensor 316 that communicates the proximity of the robot 302 with the receiving sensor 318 on the fixed station 304. The sensors 316 and 318 can be simple proximity sensors or more complex sensors that transfer information, such as RF or infrared.

The fixed station 304 comprises stationary shelves 308 that are angled and positioned to abut the delivery shelves 306 located on the robot 302. Within the fixed station 304 a set of pistons 320 are positioned to come in contact with the pallet 312. The pistons 320 are activated by the sensor 318 and serve to assist the pallet 312 transfer from the stationary shelf 308 to the delivery shelf 306. Upon receipt of a signal from the sensor 318, indicating that the robot 302 is in the appropriate position to receive the pallets 312, the piston 320 is activated to gently push the pallet 312 toward the delivery shelf 306. This allows the magnetic end 314 of the pallet 312 to come sufficiently close to the electromagnet 310 to pull the pallet 312 to, and in contact with, the electromagnet 310. To deliver the pallets 312, the electromagnet 310 would cut the power holding the pallet 312 and allow the pallet to slide onto the stationary shelf 308. In order to allow for efficient operation of this embodiment, the location of the pallet 312 must be known at all times.

A substantial amount of communication, beyond proximity, is preferably transmitted between the sensors 316 and 318. By incorporating a pressure sensor 322 in the piston 320 which is, in turn, networked to a processor, the presence of a pallet 312 on a stationary shelf 308 is known. Alternatively pressure sensors, or other types of sensors, can be incorporated on the stationary shelves 308 to indicate the presence of the pallet 312. Pressure sensors 324, or equivalent sensing device, incorporated on the delivery shelf 306, serve to indicate the presence of a pallet 312 on the robot 302. The communication between the robot 302 and the fixed station 304, either through networking or sensors 316 and 318, permits both the robot 302 and the fixed station 304 to know the location of each pallet 312. Thus, whether the pallet 312 is to be delivered to this particular station, whether this station has a pick up, etc. is known by both the robot 302 and the fixed station 304. This allows one or more robots 302 to pick up and deliver to various stations without picking up or delivering the wrong pallet.

Figure 9:
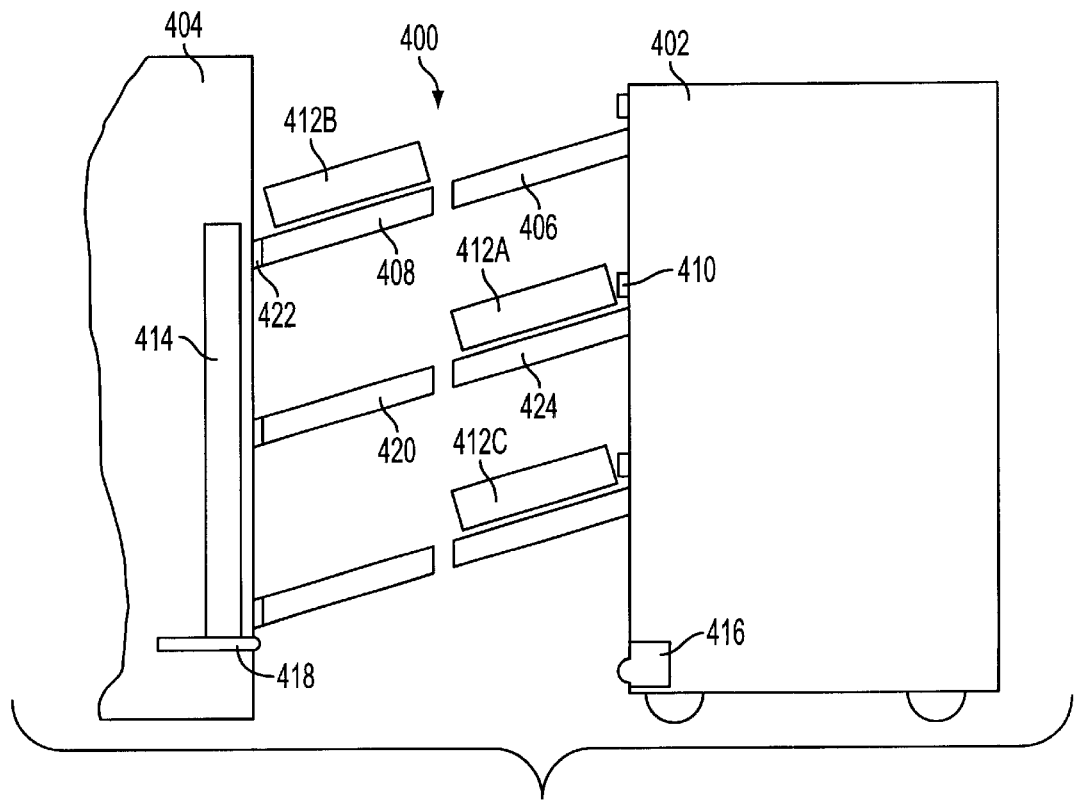
FIG. 9 is a cutaway side view of an additional multilevel system in the drop off position.
Figure 10:
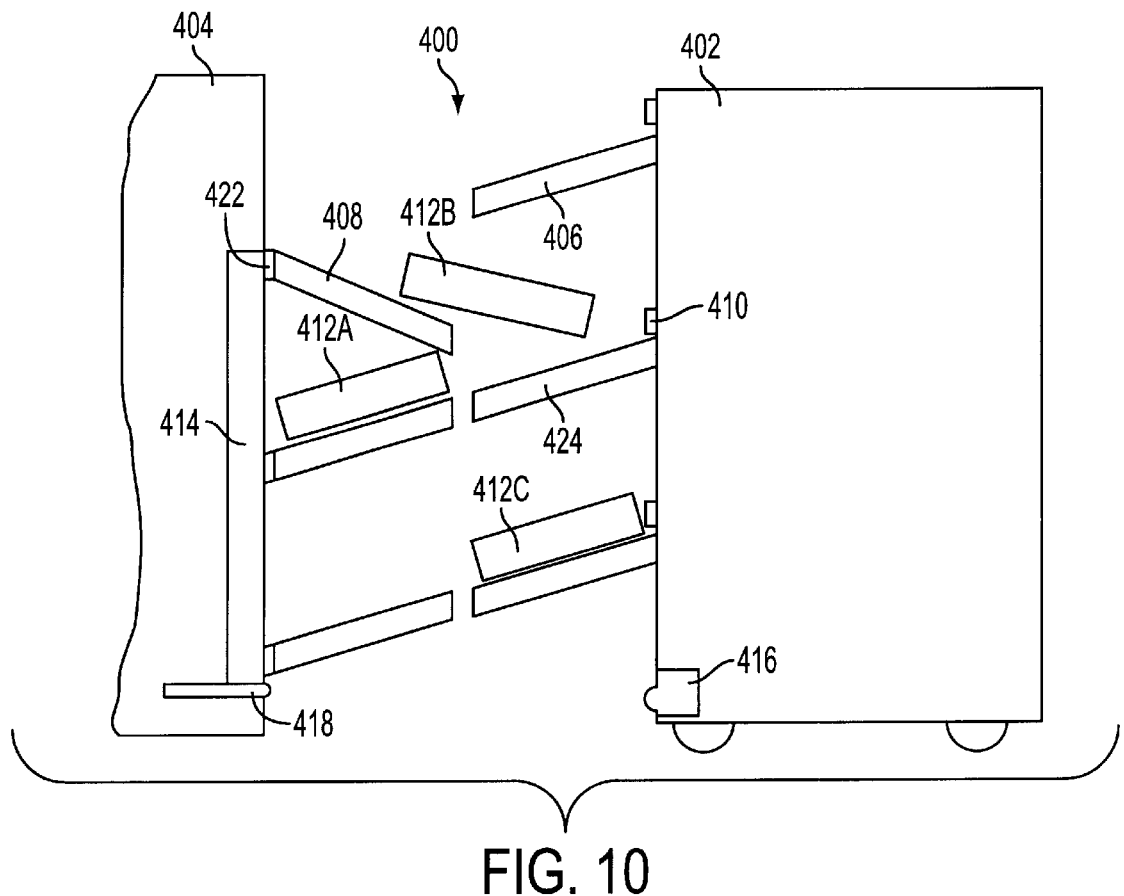
FIG. 10 is a cutaway side view of the multi-level system of FIG. 9 in the pick up position.

FIGS. 9 and 10 illustrated an alternate delivery system 400. The robot 402 approaches the fixed station 404 in the same manner as previously described. In this embodiment, the station shelves 408 are provided with hinges 422 that are released electronically, or mechanically, through control box 414. The pallets 412 are delivered, by gravity, to the fixed station 404 by the robot 402 as described heretofore in FIG. 8. The transfer of the pallets 412 from the station shelves 408 to the robot shelves 406 differs, however, in that the hinges 422 open, thereby dropping the shelves 408, in order to slide the pallet 412 onto the robot shelf 406. Although the hinges 422 can be simple electromagnetic hinges which, once the current is broken, open, it is preferable that the hinges 422 be provided with the ability to automatically reset. Hydraulics can be used to release and reset the shelves upon command and other means will be apparent to those skilled in the art.

In FIG. 9 the robot 402 approaches the fixed station 404, aligning itself for pick up and delivery. The sensor 418 informs the control box 414 of the alignment of the robot 402 and to start the pick up/delivery process. The pick up/delivery for the particular station 404, is made first by releasing the magnet 410 and allowing the pallet 412a to slide from shelf 424 onto the aligned self 420. Once the shelf 424 is empty, as communicated through the robot sensor 416 to the station sensor 418, the hinge 422 is released, allowing the shelf 408 to drop into the delivery position, sliding pallet 412b onto the robot shelf 424. As the pallet 412b slides onto the shelf 424, the magnetic force from magnet 410 attracts the pallet 412b, locking it into position. Alternatively, the arrival of the pallets 412 onto the station 404 can be detected through use of weight sensors, infra red or other sensors as known in the art.

In this representation, pallet 412c is not delivered to this station and, therefore, remains on the robot 402. Thus, the top station shelf delivers to the middle robot shelf and the middle station shelf delivers to the bottom robot shelf. Instructions to guide the mobile robot's microprocessor come from a compact computer preferably contained inside the robot and readily accessible. In its most basic embodiment, the software is written in simple text files that consist of go, stop, pause, speed settings, forward, left, and right commands. The motion reference points are based on the technology inherent within the robot, such as a guide path on the floor, lasers, etc. Dependent upon the end use of the robot, the programming complexity can be increased to provide the necessary options. Each robot can be provided with a specific program which would define a route, including each turn and direction at cross sections and which stations are subject to pick up and delivery. Because of the available complexity of the program, the robot does not need to be limited to a back and forth pattern between two stations.

The robot can be programmed to pick up from one or more stations and deliver the correct pallet(s) to the appropriate end destination(s). As robots need no lunch or break time and, using the disclosed system, do not require on the spot human interaction, a single robot can be programmed to run continually, only taking time out for recharging. Thus, a single robot program can include not only picking up and delivering the mail, but transferring supplies, specimens or lunches. Initiation of the text files can be made through a hand held wireless remote control or keys located directly on the robot body. The microprocessor communicates with a host computer via a wireless local area network (LAN). The wireless LAN technology and scheduling algorithms permit multiple robots to be guided along a maze of intersecting paths without collisions or incorrect deliveries.

In facilities where the centralized station 600 of FIG. 11 is utilized but where the materials to be delivered will vary locations from day to day, or where the item being picked up will not necessarily be delivered to the originating site, bars codes can be used on the pallets. The user places the appropriate destination for the pallet on the end of the pallet being received by the robot where it is read and entered into the robot's computer database. As the robot's program is aware of all accessible stations, the order and the corresponding bar code, the program can "fit" that delivery into its delivery schedule. Thus, at station one, the robot can pick up pallets for station 2, 5 and 7. Upon docking with station 2 to deliver the pallet, the robot picks up a pallet for station 3, 9 and 1. The robot's next action would be based on programming designed for the specific application. In the program where the robot visits each station, it would normally stop at station 3 and would release the pallet to the station 3 delivery area. If, however, the robot was programmed to only approach stations which had pallets on board, the robot would be required to redesign its delivery schedule after each pick up. In large facilities that have multiple robots transport items, the program can be carried further to also include robot identification codes on the pallet end, either printed or electromagnetic, to prevent the mail robot from picking up the specimen robot's pallet. In more complex programs, the bar codes can include a specific route required to delivery the particular pallet. Alternatively, the code can contain delivery times, required signatures, or other instructions specific to a particular pallet. In order to read the codes, by optical, mechanical or electromagnetic means, the robot would be required to have an internal code reader positioned to read the pallet end at each location.

In the side delivery system 700 illustrated in FIGS. 12, 13, and 14, the shelves 706 are placed at right angles to the forward motion of the robot. This is seen in FIG. 13 wherein the robot 702 follows the motion indicated by arrow A. The pallets 710 that are to be delivered are placed onto the robot shelves 706 at the initial loading area. Alternatively, the robot 702 can start its pick up and delivery schedule without pallets 710, picking up the pallets 710 at the first station. The robot's 702 program and guide indicators cause the robot 702 to slowly proceed in the direction of the arrow A as the robot 702 approaches the delivery shelves 708 of the station 704. The distance between the robot 702 and the station 704 must be carefully programmed to avoid collision between the robot shelves 706 and the station 704. The distance must, however, be sufficiently close to allow for the magnets 712 to attract and maintain the pallets 710. The appropriate alignment to allow for the magnets to contact one another can be maintained by guides, as previously disclosed. As noted heretofore, the pallets 710 can either be manufactured with a magnetic end or have a magnet affixed separately thereto.

As the robot 702 approaches the delivery shelves 708, the magnets 712 attract and hold the pallet 710 in position while the robot 702 proceeds to the next station. The pallets 710 remain in the shelves 708, as illustrated in FIG. 14. Although not illustrated herein, the robot 702 will pick up and deliver pallets 710 simultaneously. In instances where there is no pallet 710 on the either the delivery shelf 708 or the robot shelf 706, the robot 702 would proceed without any interaction. Although magnets 714 are not required on the robot, it provides the advantage that the robot 702 can proceed to a pick up station (not shown) to receive pallets 710. In this embodiment, the ability for the pallets 710 to freely slide off the shelves 706 without resistance is critical. Therefore, if magnets 714 are used, it is preferable that they are electromagnets that are activated only at the pick up phase and deactivated at the delivery phase. The activation and deactivation of the magnets can be easily accomplished by an internal program. Alternatively, magnets having varied power can also be used, however, care must be taken to have the attraction differential sufficient to allow for the pallets to easily remain at the station 704. This embodiment provides the advantage that it eliminates the need for the robot to stop, maneuver into position for pick up and then maneuver into position to proceed. This embodiment, does, however, restrict the approach to the station by the robot and cannot be used in areas where the station is recessed.

Figure 16:
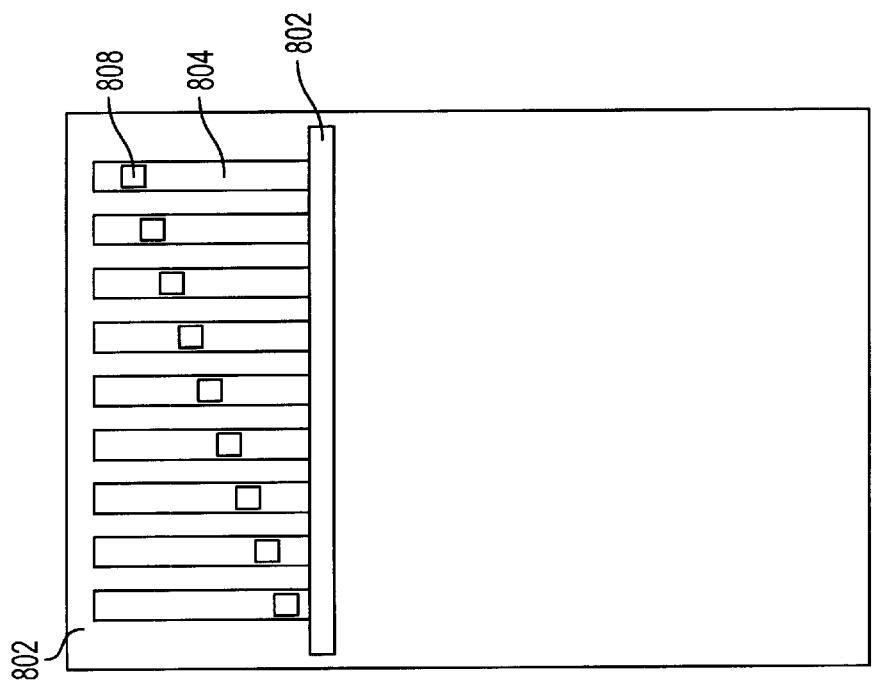
FIG. 16 is a front view of the container pick up system of FIG. 15.
Figure 15:
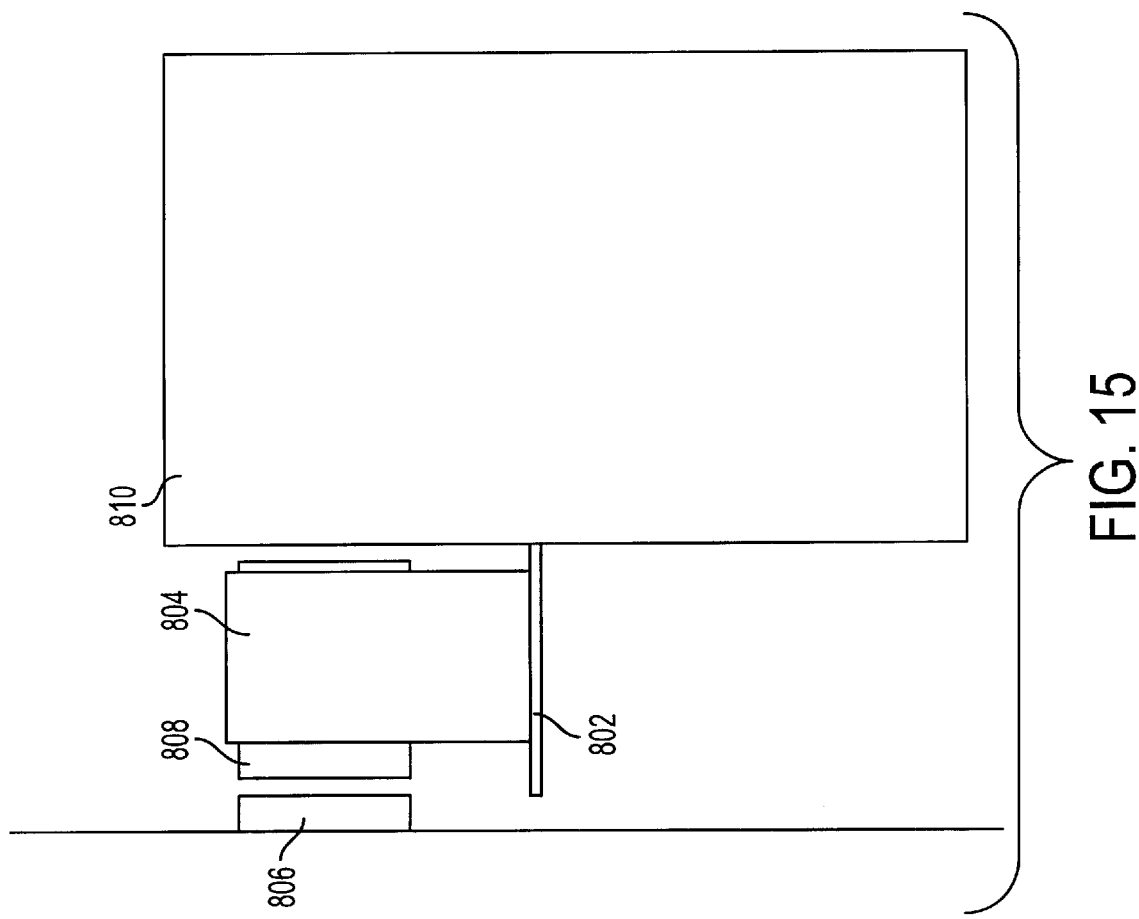
FIG. 15 is a side view of a container pick up system using magnets as the transfer means.

The use of robotics is also highly efficient as an office mail pick up and delivery system 800, as illustrated in FIGS. 15 and 16. The robot 810 is equipped with a shelf 802 extending approximately parallel to the floor. Although the shelf 802 illustrated is designed to hold mail holders 804, this is an example and other shelf and holder configurations can be incorporated. Each of the mail holders 804 has a magnet 808 which is aligned with a receiving magnet 806 placed on the receiving surface. As can be seen in FIG. 16, each of the mail holders 804 has a magnets 808 placed at a different level which, in turn corresponds with the level of the receiving magnet for the particular station. This prevents mail from being delivered to an incorrect station as the magnets only mate with magnets at a corresponding height. The delivery can be made in several ways, with the simplest method being to place the mail holders in the order of the programmed delivery schedule. The robot would approach the receiving station head on, thereby aligning the two magnets. Alternatively the receiving magnet, or other receiving means, can have a length equal to the width of the robot. Thus, when the robot approaches the magnet, only the mail holders that match the receiving magnet are removed from the robot. This has the advantage of permitting the delivery of more than one holder to a specific station. Another method of delivery is for the robot to move slowly, parallel to the receiving magnet, until the appropriate level of magnet is reached on the mail holder. The magnets in this embodiment can be replaced with any device or substance that will hold the delivery pallet with sufficient force to allow it to move from its resting location on the robot to its delivery location.

The robot 850 in FIGS. 17 and 18 includes a pick up shelf 864 in addition to the delivery shelf 862. This permits the robot 850 to simultaneously pick up and deliver mail at each station. Each of the delivery stations in this embodiment is equipped with an upper receiving magnet 856 and lower receiving magnet 858. The mail holders 852 in this embodiment are provided with rear magnets 868 that serve to reattach the mail holder 852 to the robot 850. The robot 850 is provided with a securing magnet 870 that connects with the mail holder rear magnet 868, separating the mail holder 852 from the lower magnet 858. The strength of the rear magnet 868 and securing magnet 870 must be greater than the strength of the lower magnet 858 to permit the release of the mail holder 852. If users have mail to be picked up, they hang the mail holder 852 onto the lower receiving magnet 858. As the robot 850 docks, the upper receiving magnet 856 and mail holder magnet 854 come in contact and with the rear magnet 868 and robot-receiving magnet 870, contacting one another. As the robot 850 departs, the contact is held between the rear magnet 868 and the robot-receiving magnet 870, forcing the hold between the mail holder magnet 860 and the lower magnet 858 to release. The mail holders 852, for both pick up and delivery, are arranged, and delivered, as described in the FIGS. 15 and 16. Although the mail holder 852, illustrated in FIGS. 17 and 18, is used for both pick up and delivery, the delivery holders can be a different color and the magnet 868 removed if desired.

Figure 19:
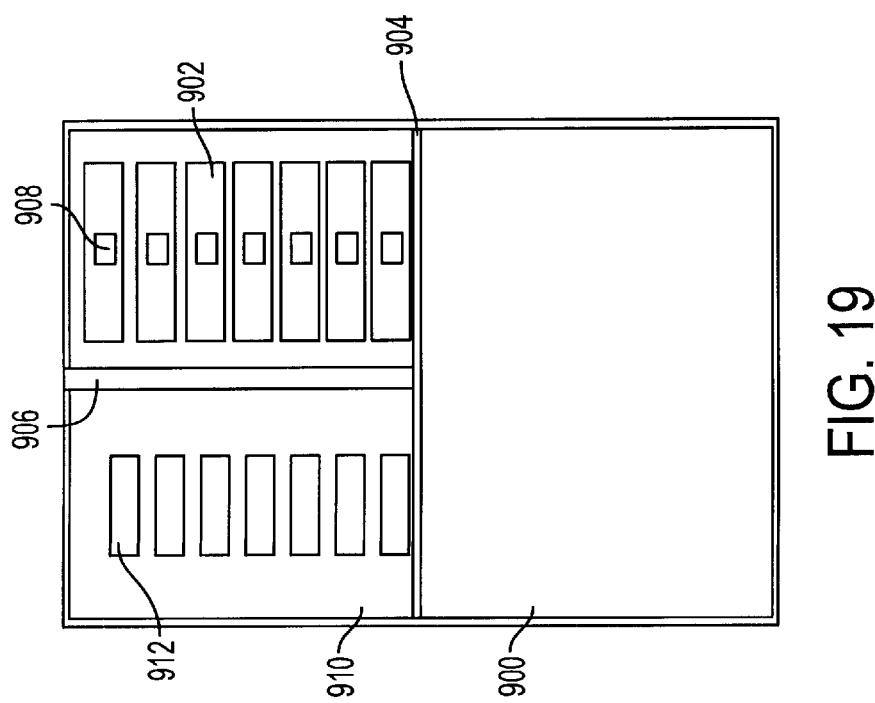
FIG. 19 is a front view of a pick up and delivery system having horizontally placed containers.

In an alternate embodiment, illustrated in FIG. 19, the robot 900 has a receiving shelf 904 and the mail holders 902 are placed horizontally on the shelf 904. The magnets on the receiving surface are aligned horizontally to match and receive the appropriate magnet 908 on the mail holder 902. The embodiment illustrated in FIG. 19 also provides a pick up area 910 that is provided with receiving magnets 912. The receiving magnets 912 remove the outgoing mail in the same manner as described heretofore in FIGS. 17 and 18. The robot can also be provided with individual horizontal shelves to hold the holders 902, thus permitting the holders 902 to be picked up and delivered randomly.

Figure 20:
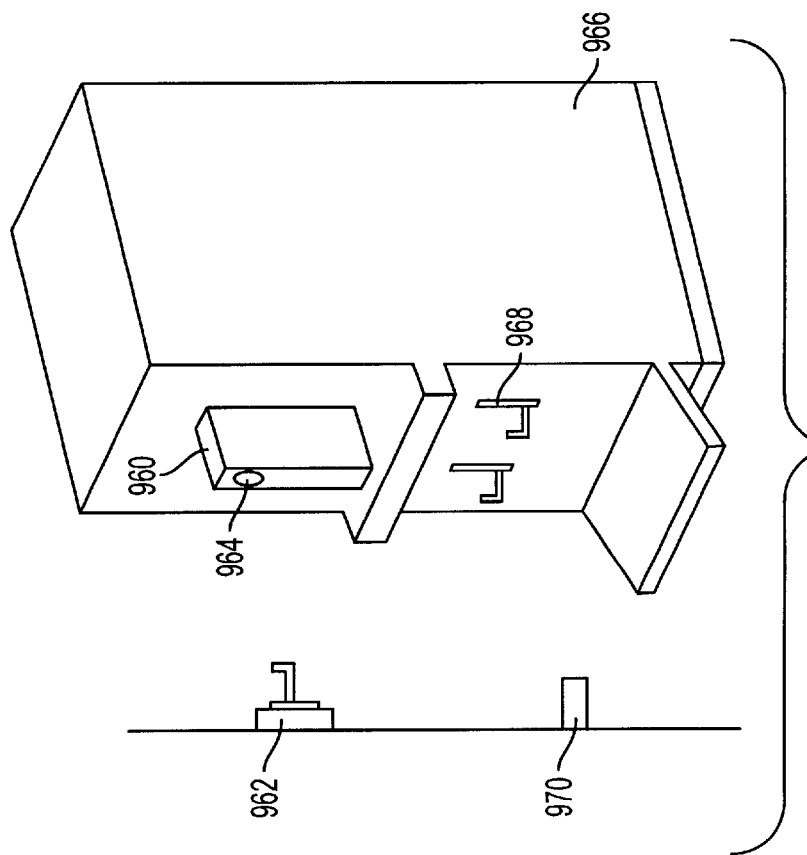
FIG. 20 is a perspective view of a pick up and delivery system using wall hooks as the transfer means.

An alternate method of securing the mail holders 960 to the receiving surface is through the use of a swivel hook 962, as illustrated in FIG. 20. The mail holders 960 have receiving ports 964 that are placed at varying heights on the holder 960 and correspond to the swivel hooks 962 placed at the appropriate height on the receiving surface. As the robot 966 docks with the receiving surface, the swivel hook 962 enters the receiving port 964. Although, as disclosed heretofore, the robot 966 can have a single shelf, the robot 966 as illustrated, provides for simultaneous pick up. Stationary hooks 968 are provided on the robot 966 to remove the holders 960 from the receiving surface. The hooks 970 should permit the holder 960 to easily slide off the hook 970. This can be accomplished by either providing a small rise at the end of the hook 970 or a hingeable lip at the hook's end. Other methods will also be apparent to those skilled in the art. It is preferable that once the robot 966 withdraws, the swivel hook 962 moves the mail holder 960 to the side. This can be accomplished by various methods, such as electromagnets, and will be known to those skilled in the art. The pick up and delivery of the holders 960 using the swivel hooks 962 is accomplished as described in the foregoing description, substituting the swivel hooks 962 for the magnets 806. The holders 960 can also be placed either horizontally or vertically on the robot 966 as long as the ports 964 are aligned with the appropriate swivel hook 964. Horizontal placement of the holders 960 does provide the advantage that once the robot 966 withdraws; the holder 960 will rotate to a position parallel to the receiving surface by gravity. In some areas, it may be desirable to prevent theft, to place locking means on the swivel hooks to retain the holders 960 on the hooks 962. In one embodiment, once the weight of the holder is registered on the hook, a locking bar would be activated, extending along the top of the holder. To withdraw the locking bar would require a specific key or code. This would prevent the holder from being lifted off the hook by any one other than cleared personnel. Other methods of locking the holder onto the hooks will be apparent to those skilled in the art. The robot 966 would be equipped with the key or code to "unlock" the device to enable the robot to remove the holder for pickup.

Although the foregoing pick up and delivery has been described in reference to mail, this is for example only and is applicable to other holders and materials. The hooks or magnets described herein as retaining structures can be substituted with Velcro®, snap devices, or other applicable methods that will permit attachment and release by the robot as described herein.

In the preferred embodiment, the robot is part of a networked computer system. In this system, the retaining structures can be electronically connected to a sensor that registers the presence or absence of the holder. The data received from the sensor can be centrally received in a computer system which is downloaded into the robot, thereby allowing the robot to chart a pick up and delivery path based on articles to be either delivered or picked up. In some instances, such as hospitals, items may need to be handled on an emergency basis. The use of the networked system allows the user to input, through any type of connected input source, the existence of an emergency pick up. The robot can be programmed to interrupt the current job to pick up and deliver the emergency item. Additional retaining devices can also be used for separate delivery locations, such as Federal Express boxes. The networked system further allows the robot to receive calendar data, such as vacation schedules, the days that certain departments or labs are open or closed, business trips, etc. This enables the robot to bypass these areas, and calculate the optimal delivery route based on programming. The sensor, whether or not networked, can be any type that registers the presence or absence of a holder, or pallet, and whether the holder is empty or full. In a fully computerized system, the sensor reads a label on the holder, transmitting to the robot the type of pick up, destination, delivery time, etc.

Alternatively, the retaining devices can send the data to an indicating device, such as a laser wireless reader, that is activated once an article is placed on the retaining structure. The robot would be fitted with a sensor capable of reading the indicating device and, unless there was a deliver required, would only stop at the stations indicating a pick up was required.

Figure 22:
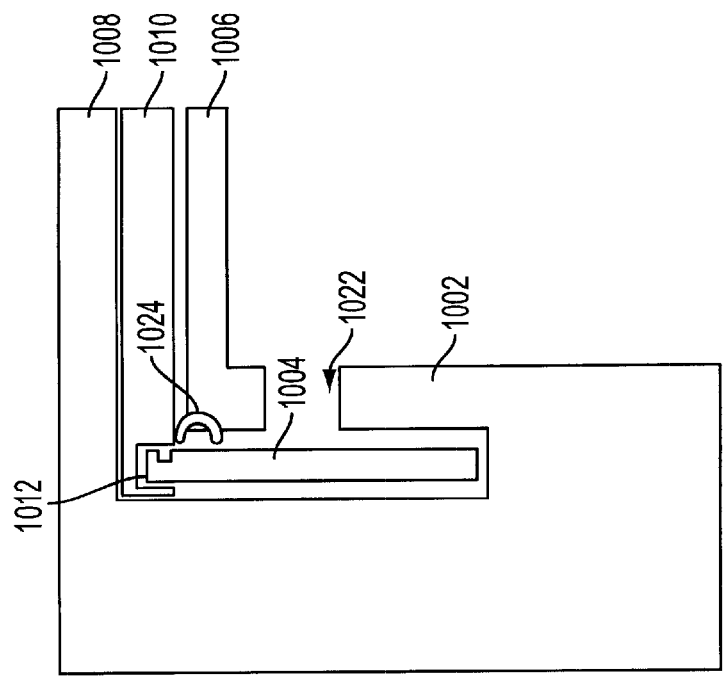
FIG. 22 is a side view of the delivery station of FIG. 21 with a pallet locked in place.
Figure 21:
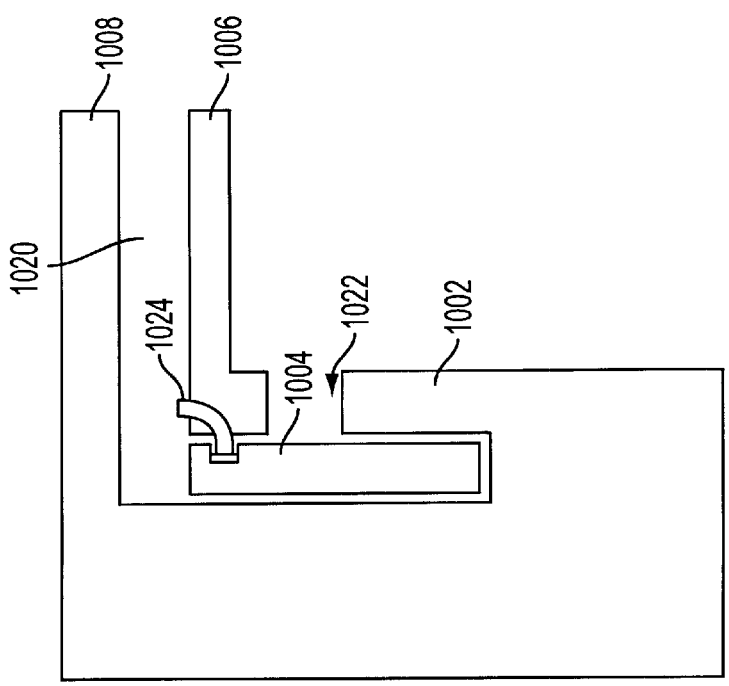
FIG. 21 is a side view of a secure delivery station to prevent of palleted items.
Figure 23:
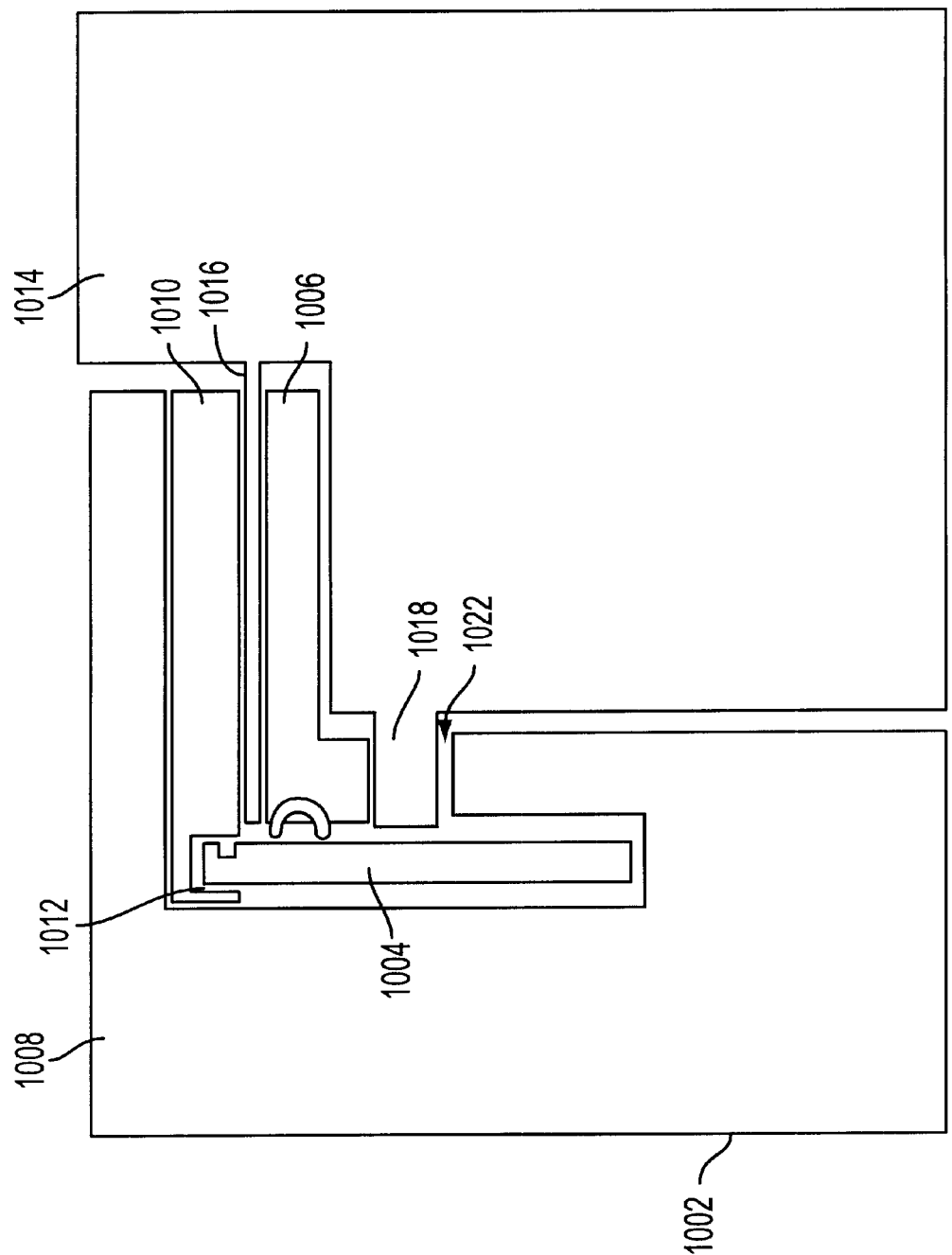
FIG. 23 is a side view of the delivery station of FIG. 22 with the robot removing the pallet.

FIGS. 21–23 illustrate a secure receiving station design that prevents theft of the articles within the pallet 1010. The station 1002 is provided with a receiving area 1020 that is enclosed except for the entry port 1020. Within the station 1002 is a method for locking the pallet 1010 in place. In the illustrated embodiment the locking member is a moving bar 1004 that moves vertically within the station 1002. As seen in FIG. 21, the bar 1004 is in a position to receive the pallet 1010 with the activating switch 1024 holding the bar 1004 in place. When the pallet 1010 is inserted into the receiving area 1020, shown in FIG. 21, the pallet 1010 opens the activating switch 1024, and release the locking mechanism (not shown) maintaining the bar 1004 in the receiving position. The pallet 1010 contains a locking indentation 1012 to receive the locking bar 1004 thereby locking the pallet 1010 within the station 1002 until released by either the robot 1014 or authorized personnel. The robot 1014 is provided with a release bar 1018 which extends into the locking port 1022 to come in contact with the locking bar 1004. The release bar 1018 is preferable retractable to allow the robot 1014 to pick up and deliver pallets 1010. The robot 1014 releases the mechanism maintaining the locking bar 1004 in the locked position, causing the bar 1004 to drop and release the pallet 1010. The locking port 1022 must have a diameter that prevents people from releasing the lock by reaching in to move the release mechanism as well as a manual release to allow human users to remove the pallets 1010. The robot 1014 has a pallet shelf 1016 that is designed to hold the pallet during pick up and delivery. The pallet shelf 1016 must be provided with a slit, or other means, that allows the locking bar 1004 to activate during delivery and still allows the robot 1014 to move away.

The pick up and delivery system disclosed herein can also be used within the home. This is especially applicable in homes with elderly or invalids where a programmed robot can retrieve food from the refrigerator, freezer or shelf directly to a person. Food would be placed in marked containers that are readable by the robot and would be delivered either upon demand or on a preprogrammed time basis. Multiple robots within a nursing home would enable the staff to attend the resident's more complicated needs rather than delivering food and drinks.

The use of coded articles to indicate delivery schedule and location can be used in many environments. One of the primary uses would be in laboratories where the handling of the item could be encoded for reading by the robot. This would enable the robot to pick up an item, delivery it to a second location, leave it at that second location for a predetermined time, pick up the item up and return it to the original location. By temporarily programming the robot to perform certain tasks, the robot can be utilized to perform a variety of functions, thereby freeing up personnel.

Heavier robots can also be used to carry people from location to location. This is predominately viable in hospital situations where a person would need to go from lab to lab for testing. The patient can be placed in a chair or stretcher capable of interacting with the robot. The robot could pick up and deliver the patient to the specified destination indicated by the patients coding, as disclosed above.

Robots additionally make excellent guides, directing visitors through large complexes such as offices and hospitals. The robots can also be programmed for security purposes, setting off alarms in the event a visitor enters a restricted area. It is preferable that the robots used herein have voice modules for communication. This allows the robot to report the inability to complete a delivery, guide a visitor or announce the arrival of specimens in a lab. The voice modules additionally make the robot more user friendly.

Preferably the robots are provided with a removable front panel which allows a single robot to perform various tasks. The panel used to pick up and deliver mail could be different than the panel used to deliver pallets to a secured station, although one panel can be designed to handle related tasks. As the robots are expensive, the ability to change panels reduces the number of robots required. The ability to change panels can additionally allow for the addition of smaller robots or electronic devices when required. Thus, for example in a factory setting, a robot could be fitted with a robotic assembly arm to assembly parts as they are being delivered from one location to another. Later the same robot could be used to drill holes in devices requiring mounting. In invalid and elderly use, the robot could contain a small microwave for heating food while moving from the kitchen to the delivery location. By providing the robot with programming that supports these various functions, the specifics to the function would be automatically handled by the robot. Therefore, if the robot took a chicken dinner out of the refrigerator to deliver, it would know, through the bar coding that indicated this was a chicken dinner, that this dinner required 10 minutes to heat.

Figure 24:
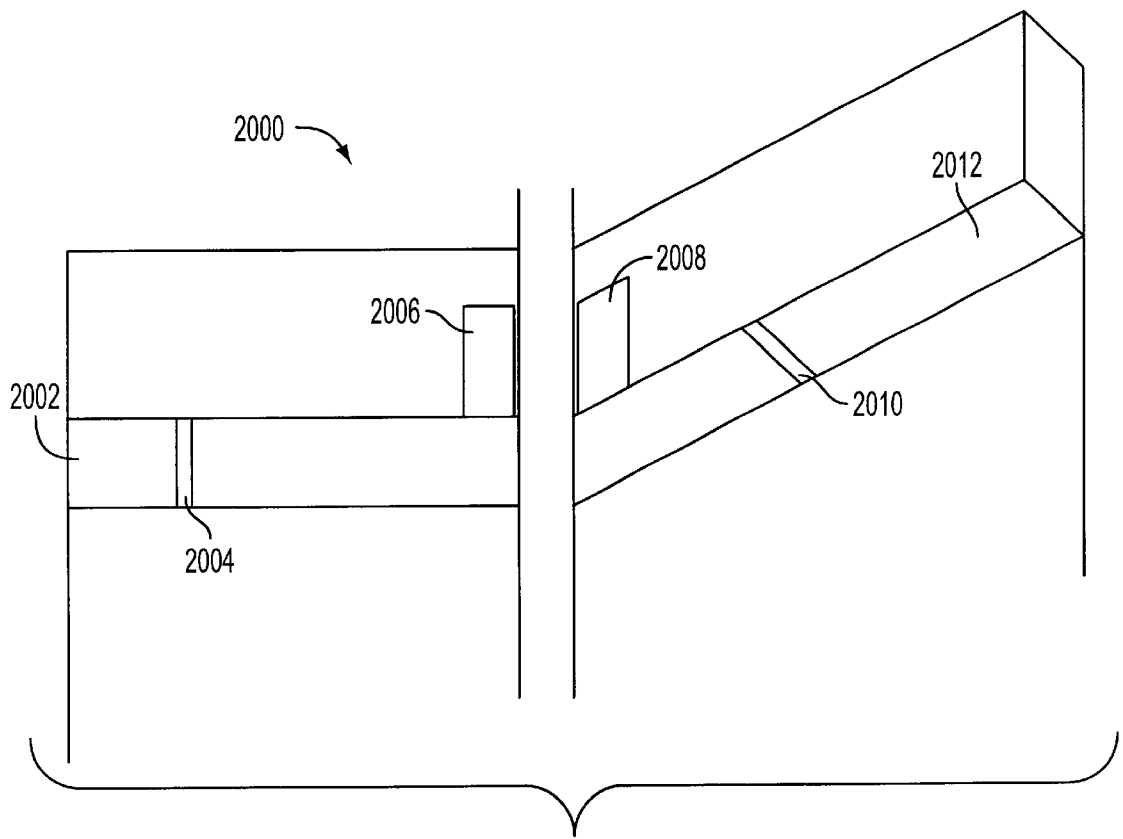
FIG. 24 is a perspective view of an analyzer capable of receiving robotic deliveries.
Figure 25:
FIG. 25 is a side view of a tray for used with the analyzer of FIG. 24.

FIGS. 24 and 25 illustrate an example of how the pallet-delivering robot disclosed above, can be used with an active system. The analyzer 2000 contains dual conveyors 2002 and 2012. The input conveyor 2002 receives the specimens for analysis and the output conveyor 2012 receives the empty tubes after analysis. The specimens are contained in test tubes carried in magnetized delivery trays 2052 along the conveyors 2002 and 2012 through use of magnetic strips 2004 and 2010. The strips 2004 and 2010 move the delivery trays 2052 to the entry port 2006 and pick up from the exit port 2008. In order for the robot to handle the delivery trays and interact with the conveyors 2002 and 2012, the robot uses a thin holding tray 2050 that is designed to interact with the surface of the conveyors 2002 and 2012. The robot is programmed to deliver the holding tray 2050 to the input conveyor 2002, pick up the empty trays 2052 at the output conveyor 2012. In order to determine whether a holding tray 2050 is empty, a sensor 2054 is placed on the back of the tray 2050. The robot looks for the sensor 2054 with blocked "vision" indicating the tray 2050 is not empty. The sensor 2054 can also be used to determine whether a tray 2050 has been left on the conveyor.

Figure 27:
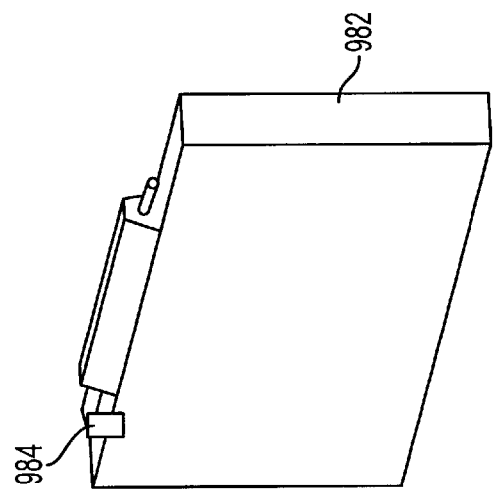
FIG. 27 is a perspective view of a delivered holder in accordance with the delivery method of FIG. 26.
Figure 26:
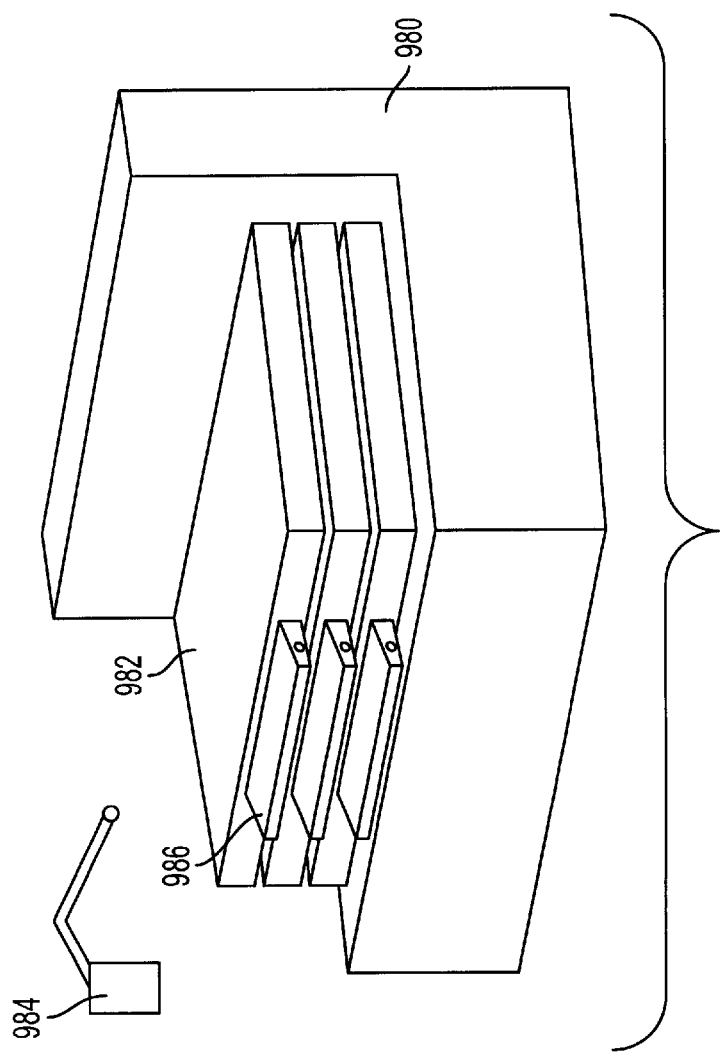
FIG. 26 is a perspective view of a delivery robot using horizontal hooks for holder removal.

FIGS. 26 and 27 illustrate the delivery robot 980 delivering the next holder 982 to the horizontal hook 984. As can be seen, the holders 982 are provided with horizontal delivery channels 986 that are designed to receive the horizontal hook 984. As the hook 984 enters the delivery channel 986, the holder 982 is slid from the robot 980 moving in the direction of arrow A. Once completely removed from the robot 980, the holder 982 rotates around the horizontal hook 984 and rests flush with the delivery surface. In the illustrated embodiment the robot cannot simultaneously pick up and deliver the holders, however a second layer can be added to the robot 980 for either pick up or delivery purposes. The hooks 984 would be reversed to permit removal of one holder while delivering another.

An advantage to the use of electromagnetics in the instant disclosure is the ability to pick and chose the pallets to be delivered based on the delivery schedule. This advantage is clearly seen in the side approach illustrated in FIGS. 12–14, although it is applicable for all embodiments. Therefore, if a pallet is to remain at the station for a second robot pick up, or remain on the robot for delivery to another station, the activation of the electromagnets is not switched. This permits the pallet to remain in its original position until the appropriate pick up or delivery schedule.

The approach and delivery methods for the foregoing embodiment differ substantially however the basic delivery concept remains the same. By providing alternatives for approach and delivery, the mobile robot becomes adaptable to a variety of applications and is more easily integrated into existing facilities.

There are further alternative embodiments of this invention. For example, the pallets may all rest on the top surface of the robot. The robot could be programmed to approach the delivery location either from the front, back or side of the robot depending on its drive mechanism. Pallets could also be stored in locations in the side, back or front of the robot. The pallets could be aligned with the delivery location.

As stated earlier, the docking mechanism can consist of a pair of materials that serve to attract each other such as an electromagnet, mechanical docking device, Velcro®, negative pressure, or passive flexible barrier. An alternative to a docking mechanism is a device that would expel the pallet off of the robot onto the delivery location or push the pallet back onto the robot. The expelling device could be a pair of magnets with their poles aligned, air pressure, a spring mechanism, gravity, or mechanical device capable of forward force.

Examples of mobile robots that are applicable to use with the above delivery system are provided hereinafter. It should be noted that the robots listed are examples only and in no way limit the scope of the invention. The Helpmate is a mobile robot that has been used most extensively in medical facilities. Currently, human operators must open a door to the HelpMate backpack and either load or unload the payload. The RoboCart is the smallest mobile robot on the medical market and carries a specimen tray that is 18 inches wide and 26 inches long. The tray extends out over the width of the cylindrical base and allows for a one-inch clearance over the top of a workbench. The ability to extend over the top of a counter allows for easy loading and unloading. The Transporter, by Saurer, is larger than the RoboCart, yet smaller than the Helpmate and can be used for bulk delivery of materials or specimens where large payload capacity is essential. The Transporter has an integrated control system that al lows programmable dispatching using a computer or on-board keypad.

Since other modifications and changes varied to fit particular operating requirements and environments will be apparent to those skilled in the art, the invention is not considered limited to the example chosen for the purposes of disclosure. The disclosure covers all changes and modifications which do not constitute departures from the true spirit and scope of this invention.

What is claimed is:

1. A pick up and delivery system for use with at least one mobile robot traveling on a base surface, said system comprising:
   at least one fixed station, said at least one fixed station comprising a pick up position and a delivery position; said pick up position having:
      at least one pick-up pallet retaining surface;
      a holding member, said holding member being affixed to said pick up position proximate said at least one pick-up pallet retaining surface and having a first retaining strength;
   said delivery position having:
      at least one delivery pallet retaining surface;
      a delivery member, said delivery member being affixed to said delivery position proximate said at least one delivery pallet retaining surface and having a second retaining strength;
   said at least one mobile robot having:
      at least one shelf,
      at least one retaining member, said retaining member having a third retaining strength;
   at least one pallet, said at least one pallet having a pair of ends and a length, each of said ends having securing means, said securing means interacting with said holding member, said delivery member and said retaining member;
   said third retaining strength being greater than said first retaining strength and said second retaining strength being greater than said third retaining strength;
   wherein said retaining member interacts with said securing means to pick-up and maintain said at least one pallet from said at least one pick-up pallet retaining surface to said shelf on said robot; and
   wherein said delivery member interacts with said securing means to deliver and maintain said at least one pallet from said shelf to said delivery pallet retaining surface.

2. The system of claim 1 wherein said at least one fixed station further comprises a body, each of said pick-up and delivery pallet retaining surfaces being at right angles to said fixed station body and parallel to said base surface.

3. The system of claim 2 wherein said at least one shelf is parallel to said base surface and further comprises at least one stop bar, said at least one stop bar being secured to said at least one shelf.

4. The system of claim 3 wherein said at least one shelf has a height from said base surface slightly greater than the height of said pallet pick-up and delivery retaining surfaces from said base surface, thereby allowing said at least one shelf to overlap each of said pallet retaining surfaces a distance sufficient to allow said retaining member to come in contact with said pallet securing means.

5. The system of claim 2 further comprising at least one stop bar, said stop bar being affixed to said shelf, said stop bar further comprises a spring member, said spring member moving horizontally to absorb shock when said robot docks with said at least one fixed station to prevent damage to said at least one fixed station, said pallet and said robot.

6. The system of claim 2 further comprising guide bars, said guide bars being affixed to said at least one shelf and directing the direction of said at least one pallet to enable said securing means to contact said retaining member.

7. The system of claim 2 wherein the height from said base surface to said pick-up and delivery pallet retaining surfaces is adjustable along said body.

8. The system of claims 7 wherein said at least one fixed station further comprises receiving notches, said receiving notches being positioned at various distances from said base surface and said pick-up and delivery pallet retaining surfaces further comprises flanges, said flanges interacting with said receiving notches to affix said pick-up and delivery retaining pallet surfaces along said at least one fixed station.

9. The system of claim 1 wherein said at least one shelf is a different height from other shelves, thereby enabling said robot to carry multiple pallets and dock with said at least one fixed station having said pick-up and delivery pallet retaining surfaces at multiple heights.

10. The system of claim 1 wherein said at least one fixed station further comprises a body, and wherein at least one set of said pick-up and delivery pallet retaining surfaces is at a different height from other pickup and delivery pallet retaining surfaces along said body, one end of said set of pick-up and delivery pallet retaining surfaces being attached to said body, and an other end of said set of pick-up and delivery pallet retaining surfaces being unattached to said body.

11. The system of claim 10 wherein said pick-up and delivery pallet retaining surfaces are at an angle from said body, said attached end being closer to said base surface than an unattached end.

12. The system of claim 11 wherein said at least one mobile robot further comprises a body having a vertical side, and wherein said at least one shelf is at a different height from other shelves along said vertical side of said at least one mobile robot, one end of said at least one shelf being attached to said vertical side, thereby enabling said at least one mobile robot to pick up and deliver multiple said pallets to said at least one fixed station simultaneously.

13. The system of claim 12 wherein said at least one shelf is at an angle from said vertical side, said attached end being farther from said base surface than an unattached end.

14. The system of claim 13 wherein said unattached ends of each of said pickup and delivery pallet retaining surfaces and said unattached end of each of said shelves abut one another, thereby allowing said pallet to slide from said shelves to said pickup and delivery pallet retaining surfaces.

15. The system of claim 13 further comprising piston means, said piston means being within said fixed station body proximate said pick-up and delivery pallet retaining surfaces, said piston moving said at least one pallet to said at least one shelf to come in contact with said at least one retaining member.

16. The system of claim 10 wherein said pick-up and delivery pallet retaining surfaces are hinged to said fixed station body and releasing said hinge places said unattached end closer to said base surface than said attached end, thereby permitting said at least one pallet to slide onto said at least one shelf.

17. The system of claim 1 wherein said holding member, said delivery member and said at least one retaining member are magnets.

18. The system of claim 1 wherein said holding member, said delivery member and said at least one retaining member are electromagnets.

19. The system of claim 18 wherein said at least one fixed station and said at least one mobile robot further comprise multiple sensors, each of said multiple sensors being positioned to register the presence or absence of a pallet.

20. The system of claim 19 wherein each of said multiple sensors transmits the absence or presence of a pallet to a processing unit, whereby said at least one mobile robot receives the location of said at least one pallet to pick up and said processing unit can track the location of said at least one pallet.

21. The system of claim 1 wherein said at least one mobile robot approaches said at least one fixed station at right angles to said pick-up and delivery pallet retaining surfaces.

22. The system of claim 1 wherein said at least one fixed station further comprises a locking member, said locking member locking said at least one pallet within said at least one fixed station to prevent access to said at least one pallet until released by said at least one mobile robot or released manually.

23. The system of claim 22 wherein said at least one mobile robot further comprises a pallet release member, said release member releasing said locking member to permit removal of said at least one pallet from said at least one fixed station.

24. The system of claim 1 wherein a first of said ends of said at least one pallet comprises a sensor and has height from a base portion of said length greater than a second end, whereby said at least one mobile robot communicating with said sensor indicates said at least one pallet is empty and said at least one mobile robot not communicating with said sensor indicates said at least one pallet is full.

25. The system of claim 1 wherein said at least one pallet is configured to mate and interact with a deliver area of a machine, said at least one mobile robot delivering said pallets to said machine, said delivered pallets being at least partially full of contents therein, and removing said pallets from said machine, said removed pallets being vacant of contents therein.

* * * * *